United States Patent [19]

Colton et al.

[11] Patent Number: 5,138,657
[45] Date of Patent: Aug. 11, 1992

[54] METHOD AND APPARATUS FOR CONTROLLING A DIGITAL CROSSCONNECT SYSTEM FROM A SWITCHING SYSTEM

[75] Inventors: John R. Colton, Freehold, N.J.; Charles D. Gavrilovich, Naperville, Ill.; Richard N. Kennedy, Jr., Naperville, Ill.; John J. Kulzer, Naperville, Ill.; Reinhard Metz, Wheaton, Ill.; Larry A. Russel; Teresa L. Russell, both of Atlantic Highlands, N.J.

[73] Assignee: AT&T Bell Laboratories, Murray Hill, N.J.

[21] Appl. No.: 617,477

[22] Filed: Nov. 20, 1990

Related U.S. Application Data

[63] Continuation-in-part of Ser. No. 507,099, Apr. 9, 1990, abandoned, which is a continuation-in-part of Ser. No. 425,641, Oct. 23, 1989, abandoned.

[51] Int. Cl.⁵ .......................... H04Q 7/14; H04Q 3/54; H04Q 3/66
[52] U.S. Cl. .................................... 379/220; 379/244; 379/268
[58] Field of Search ................ 379/112, 244, 268, 219, 379/220

[56] References Cited

U.S. PATENT DOCUMENTS

| | | | |
|---|---|---|---|
| 3,920,916 | 11/1975 | Brightman et al. | 179/15 |
| 4,146,749 | 3/1979 | Pepping et al. | 179/15 |
| 4,322,843 | 3/1982 | Beuscher et al. | 370/63 |
| 4,550,404 | 10/1985 | Chodrow et al. | 370/110.1 |
| 4,577,312 | 3/1986 | Nash | 370/84 |
| 4,683,584 | 7/1987 | Chang et al. | 379/269 |
| 4,704,716 | 11/1987 | Bowers et al. | 370/58 |
| 4,763,317 | 8/1988 | Lehman et al. | 370/58 |
| 4,805,166 | 2/1989 | Ardon et al. | 370/54 |
| 4,896,350 | 1/1990 | Bicknell et al. | 379/220 |

OTHER PUBLICATIONS

R. J. Canniff, "A Digital Concentrator for the SLC ™-96 System", *The Bell System Technical Journal*, vol. 60, Feb. 1981, No. 2, pp. 121-158.

N. B. Abbott et al., "System Overview", *The Bell System Technical Journal*, vol. 61, Apr. 1982, No. 4, pp. 391-417.

AT&T 365-301-004 "DACS IV (Digital Access and Crossconnect System IV)".

*AT&T Technical Journal*, Jul.-Aug., 1985, vol. 64, Part 2.

(List continued on next page.)

*Primary Examiner*—Stafford D. Schreyer
*Attorney, Agent, or Firm*—Ross T. Watland; Werner Ulrich

[57] ABSTRACT

This invention relates to apparatus and a method for controlling a Digital Access and Crossconnect System (DACS) from a connected toll switching system. All control messages from operations support systems (OSS) for making crossconnect changes in the DACS are first routed to the toll switch. The toll switch extracts information needed to update its database and sends a control message to the DACS. In addition, the toll switch responds to changes in traffic patterns, perhaps due to the loss of a transmission facility, to generate a crossconnect change message to the DACS to rearrange facilities for more optimum performance. Advantageously, the OSSs for DACS control and switch control is combined and the toll network is made more responsive to traffic pattern changes and to losses of transmission facilities.

Also disclosed are embodiments where a DACS interconnection arrangement is integrated into a switching system, under a common control structure, in a local, central office wire center, and an embodiment where the interconnection arrangement is implemented using add/drop multiplexers connected in a fiber ring in a distributed architecture rather than using a DACS.

84 Claims, 14 Drawing Sheets

OTHER PUBLICATIONS

Northern Telecom Marketing Bulletins dated Oct. 12, 1989, entitled, "S/DMS AccessNode Residential Fiber Access Applications", FiberWorld Wire Central Consolidation, S/DMS TransportNode, S/DMS AccessNode Business Access Applications, S/DMS SuperNode System, S/DMS SuperNode Remote Access in the FiberWorld, FiberWorld Services, Fiber World Operations, Administration, Maintenance & Provisioning, SONET Overview.

Northern Telecom Product Announcements dated Oct. 12, 1989, entitled, "Northern Telecom Introduces Sonet-Based DMS Supermode Product Family", Northern Telecom Introduces Sonet-Based Fiber Transport System, Northern Telecom Introduces Sonet-Based Fiber Access System, Background Information-The Technology Behind Fiber World.

News Release—Northern Telecom Introduces "Fiberworld" Family of Fiber Optic Transmisson/Switching Products—dated Oct. 12, 1989.

Copies of slides dated Oct. 10, 1989, entitled "Fiber World".

Copies of slides dated Oct. 9, 1989, and Oct. 10, 1989, entitled "The Products" by John Taylor.

*Northern Telecom Introduces FiberWorld*, dated Nov. 1989.

W. Leckie, et al., "Switching System Evolution: A Resource Decoupled Approach", International Switching Symposium, No. XIII, May 27–Jun. 1, 1990.

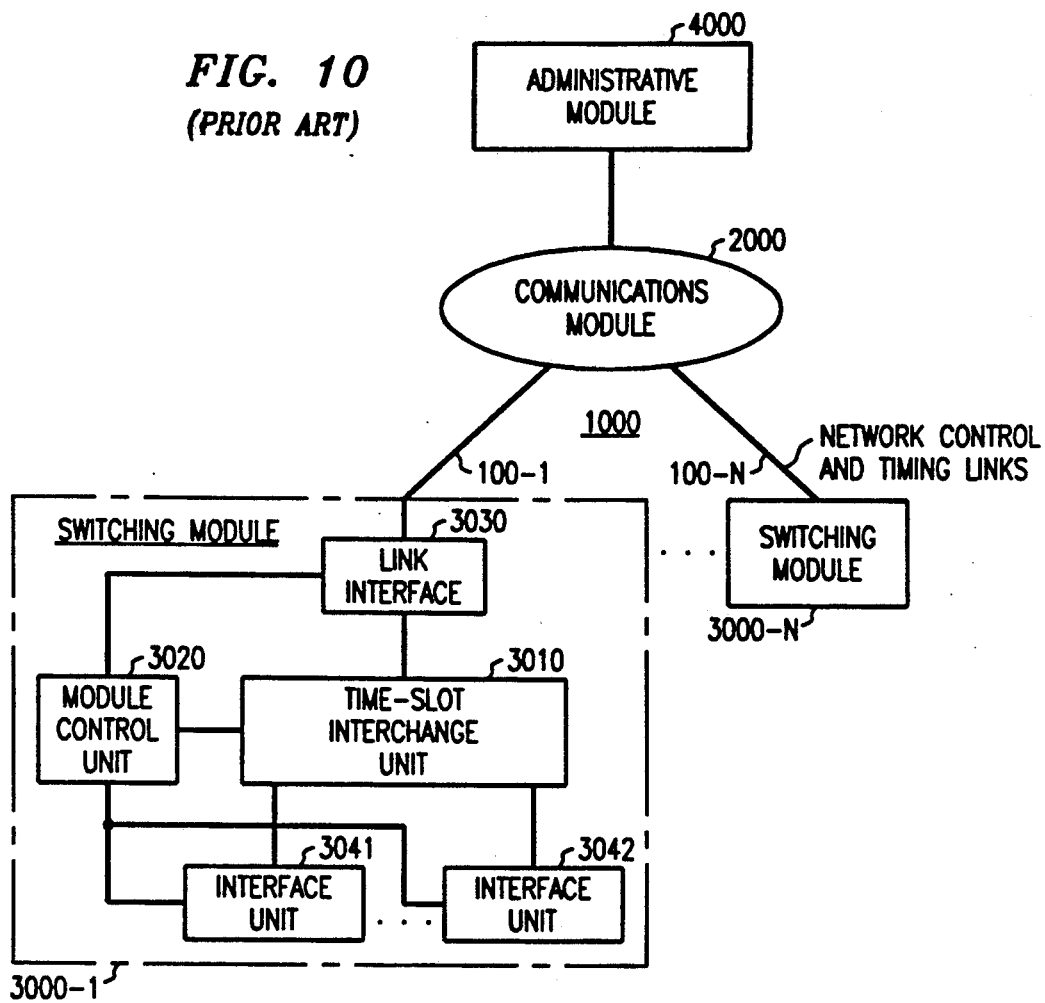
FIG. 10
(PRIOR ART)
FIG. 11
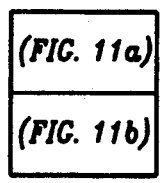

ADD/DROP FIBER RING ARCHITECTURE

METHOD AND APPARATUS FOR CONTROLLING A DIGITAL CROSSCONNECT SYSTEM FROM A SWITCHING SYSTEM

This application is a continuation-in-part of application Ser. No. 07/507,099, filed on Apr. 9, 1990, which is a continuation-in-part of Ser. No. 07/425,641, filed Oct. 23, 1989, both now abandoned.

RELATED APPLICATION

This application is related to the application of R. C. Lee et al. entitled "Method and Apparatus for Providing Real-Time Switching of High Bandwidth Transmission Channels" which application was filed concurrently with the parent application Ser. No. 07/425,641 and is assigned to the assignee of the present application. This application is also related to the application of M. T. Ardon et al. entitled "Method and Apparatus for Reconfiguring Interconnections Between Switching System Functional Units" which is being filed concurrently with this continuation-in-part application and is also assigned to the same assignee.

TECHNICAL FIELD

This invention relates to a method and apparatus for controlling a crossconnect system from a switching system.

PROBLEM

A large common carrier network such as the AT&T toll network, actually comprises two separate networks. The first is the switched network for setting up individual connections in response to dialed individual customer requests, hereinafter referred to as the switched public common carrier network. The second is a facilities network for assembling small facility inputs such as a 1.5 megabit T-carrier facility (DS1 signal) into large facility outputs, for example for fiber optic transmission, for disassembling large facility inputs to generate small facility outputs, and for switching small facility outputs to destination outputs for use by the switched public common carrier network and for use by private network customers. The facilities switched network is connected directly to the switched public common carrier network for providing facilities for carrying communications for the trunks used by the switched public common carrier network and is connected directly to private network customers for providing private facilities to these customers.

Although these two networks are heavily interconnected, they are administered separately. The facilities switching network comprises a plurality of facilities crossconnect systems such as the Digital Access and Crossconnect Systems (DACS); the crossconnect systems are an automation of manually controlled cross connect arrangements, interconnected with each other, with toll switches and with private customers. The DACS systems differ in basic ways from toll or local switching systems. Unlike the toll or local switching systems which are arranged to switch between individual trunks, each for carrying one communication, the DACS systems switch facilities such as a DS1 signal for carrying communications of a plurality of trunks. The DACS switches operate relatively slowly for setting up long term inter-switch connections and have no arrangements for responding to call processing input signals from customers or from a switching system for setting up individual call connections. These switches are controlled by an operation support system (OSS) which provides the basic information needed by DACS to set up the long term connections within each DACS system. This is in contrast to a toll switching system, or toll switch, which responds to individual call set-up requests to set up one call connection, involving one trunk, at a time. Groups of trunks are then attached on a non-switched basis to the facilities for carrying the communications on these trunks.

The primary input for controlling switching in a toll switch is the signals, received directly or indirectly from an individual telephone customer, requesting a connection. In addition, an operation support systems for the toll switches coordinates the translation data describing the destination of each trunk in a toll switch with the actual destinations of these trunks as established by the DACS systems interconnecting the facilities that are carrying that trunk. Thus, the DACS systems use a completely separate information source for controlling the connection of the facility or facilities to be supplied for each route in the toll network.

A problem in the prior art is that the DACS systems, which provide facilities to the toll switches, do not have information about the current status of traffic in the toll network, thus making it impossible for these systems to respond directly to changes in traffic. Correspondingly, because of the separate engineering from different OSSs, only the DACS systems have access to the information about the use of facilities for private networks to indicate limitations of facilities which could be supplied to the public switched network.

A further problem is that many private network customers use private services provided directly through interconnected DACS systems and also use public services, such as software defined networks, which are implemented through the use of the switched public common carrier network. The coordination of the response to customer demands for both of these services is difficult because of the separation of administration of the DACS network and the switched public common carrier network.

In summary, problems of the prior art are that it is costly to have separate administration of the digital access cross connect network and the switched public common carrier network, that this separate administration leads to an inefficient interface with customers who have facilities terminating on both of these networks, and that this separate administration makes it difficult to optimize the use of the totality of capabilities of both networks.

SOLUTION

A technical advance is made over the prior art in accordance with the present invention wherein, in one exemplary embodiment, the toll switches and the DACS are supplied with a control interface for permitting a toll switch to request facilities connections in the DACS switch. A toll switch, upon receipt or detection of information for setting up new trunk groups or adding or subtracting from existing trunk groups sends control messages to the DACS to connect the facilities corresponding to these groups. The toll switch maintains a record of both private and public connections in the DACS in order to maintain the information necessary for determining whether and which additional facilities are available. The toll switch also receives direct customer input for rearranging facilities for that customer. Advantageously, since the toll switch network has direct access to the present status of public switched common carrier traffic, such arrangements make it possible to respond dynamically to changes in these traffic patterns. Advantageously, a single interface to an operation support system (OSS) can be used for controlling both the toll switch and the DACS. Advantageously, customer signals received at the toll switch can be used to control DACS connections.

In accordance with one aspect of the invention, a DACS is controlled from an associated toll switch. Advantageously, such an arrangement permits maintenance control of the DACS from the toll switch and from the operation support system associated with the toll switch.

Accordingly, this invention relates to a method and apparatus for controlling an automatic facilities crossconnect system from a communications switching system for generating and transmitting control messages to the crossconnect system for establishing and disconnecting crossconnections therein.

An illustrative method of the invention is used in a central office wire center CO-2000 (FIGS. 11a and 11b) including an interconnect arrangement (DNU 2059) terminating transmission facilities (2060, 2070), and further including a switching system including peripheral units (AIUs, TIUs) for interfacing peripheral circuits (lines, trunks) with the switching system. The switching system also includes switching units (TSIUs 2031, 2032) for providing switched communication among the peripheral circuits in response to calls to and from the peripheral circuits. The wire center further includes a control means (AM 2052) common to the interconnect arrangement and the switching system. In response to the control means, the interconnect arrangement interconnects the switching system and at least one multiplex of circuits (e.g., a DS1 multiplex comprising 24 circuits) of at least one of the transmission facilities. Also in response to the control means, the switching system establishes calls to and from individual circuits of that multiplex.

The interconnect arrangement also interconnects units of the switching system. For example, the interconnect arrangement interconnects a peripheral unit (AIU 2117) at a remote terminal (RT-2000) and a switching unit (TSIU 2031) at the central office wire center. Alternatively, the interconnect arrangement interconnects a peripheral unit and a switching unit that are both located at the central office wire center. The interconnect arrangement is usable to interconnect two switching units, e.g., a host switching unit (TSIU 2031) at the central office wire center and a remote switching unit (TSIU 2033) at a distance from the wire center, or two distributed switch units (TSIUs 2031, 2032) at the wire center. The switching system further includes a central switch (CM 2055) for providing switched communication between different switching units (TSIUs 2031, 2032).

An illustrative combination in accordance with the invention comprises a switching system, an interconnect means (DNU 2059), and control means (AM 2052) common to the switching system and the interconnect means. The switching system selectively interconnects ones of a plurality of communication circuits (DS0 circuits). The interconnect means selectively interconnects ones of a plurality of communication multiplexes (e.g., DS1 multiplexes each comprising 24 DS0 circuits). A first of the multiplexes (a DS1 on PCT link 2071) is connected to the switching system. The control means controls both the interconnection by the interconnect means of ones of the multiplexes, and the establishment by the switching system of calls to and from individual ones of the circuits of the first multiplex.

The control means includes a common operations, administration, maintenance, and provisioning system for the switching system and the interconnect means. The interconnect means has a plurality of ports (connected to IUs 2063-2069) and interconnect control means (DACS controller 2061) for controlling the interconnection of the ports. The interconnect means and the switching system are colocated at a central office wire center (CO-2000).

A second multiplex (a DS1 on link 2122) conveys information to and from peripheral communication circuits (lines 2118). The control means controls the interconnection by the interconnect means of the first and second multiplexes, and the establishment by the switching system of calls to and from individual ones of the peripheral circuits via the first multiplex, the interconnect means, and the second multiplex.

A third multiplex (a DS1 on link 2060) and a fourth multiplex (a DS1 on link 2070) are not connected to the switching system. The control means controls the interconnection of the third and fourth multiplexes. The third and fourth multiplexes may be connected to other switching systems and interconnect means that are independent of the control means.

In an alternative embodiment (FIG. 12), the function of the interconnect arrangement, rather than being performed by a crossconnect system, is instead performed by a plurality of add/drop multiplexer units (DDM-2000) each connected to an associated distributed switch means (SM-2000) and controlled by the associated distributed control means (SMP). The multiplexer units are interconnected in a fiber ring.

An illustrative combination (FIGS. 13a, 13b, 13c) in accordance with the invention comprises a switching system, an interconnect means (DNU 3059), and control means (AM 3052, SMP 3045) common to the switching system and the interconnect means. The switching system selectively interconnects ones of a plurality of communication circuits (DS0 circuits). The interconnect means selectively interconnects ones of a plurality of communication multiplexes (e.g., DS1 multiplexes each comprising 24 DS0 circuits). A first of the multiplexes (a DS1 on PCT link 3071) is connected to the switching system. The control means controls both the interconnection by the interconnect means of ones of the multiplexes, and the establishment by the switching system of calls to and from individual ones of the circuits of the first multiplex.

Illustratively, the switching system comprises a plurality of distributed switch means (SM-3000, SM-3000'). The first multiplex (e.g., a DS1 on PCT link 3071) is connected to a first one of the distributed switch means (SM-3000) and a second multiplex (e.g., a DS1 on PCT link 3072) is connected to a second distributed switch means (SM-3000'). A third multiplex (on PCT link 3080) conveys information to and from lines (3111), and a fourth multiplex (on PCT link 3080') conveys information to and from lines (3111'). The control means controls the interconnection by the interconnect means (DNU 3059) of the first and second multiplexes, and of the third and fourth multiplexes, and the establishment by the switching system of calls to and from individual ones of the lines 3111 and calls to and from individual ones of the lines 3111'. AM 3052 cooperates with SMP 3045 to control DNU 3059.

The switching system includes first switching means located at a central office (CO-3000) and second switching means (SM-3000") at a remote location (RSM-3000). The interconnect means (DNU 3059) is colocated with the first switching means at the central office. Illustratively, the combination further includes interconnect means (DNU 3059') colocated with the second switching means at the remote location.

The interconnect means (e.g., DNU 3059) also selectively interconnects first and second broadband links 3091 and 3092, where broadband link 3091 is connectable to broadband terminal BT-3000 and broadband link 3092 is connectable to broadband terminal BT-3000'. The control means responds to a call request for a real-time, switched broadband connection between broadband terminals BT-3000 and BT-3000' by controlling the interconnect means to interconnect broadband links 3091 and 3082.

BRIEF DESCRIPTION OF THE DRAWING

FIGS. 8-10 are diagrams of a prior art switching system;

DETAILED DESCRIPTION

Figure 1:
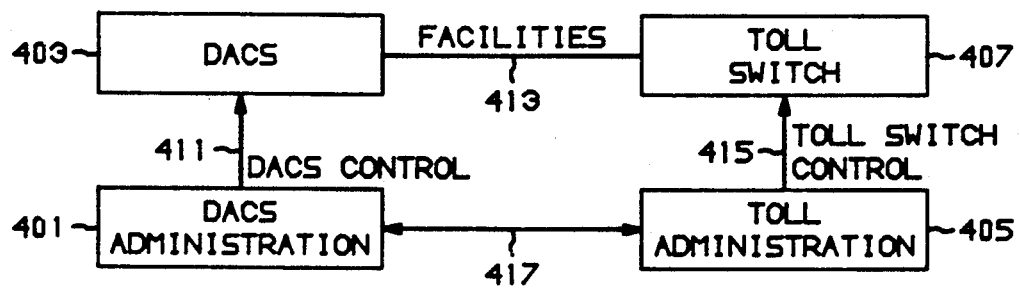
FIG. 1 is a diagram of the prior art configuration between operation supports systems (OSSs), DACS, and toll switches.

FIG. 1 depicts the prior art. Two separate operation support systems (OSSs) exist, one, a DACS administration system 401 and the other a toll administration system 405. The DACS administration system is aware of facilities that are connected to the DACS 403. The DACS administration system sends control messages over link 411 to request the DACS 403 to set up connections for facilities 413 between interconnecting the DACS 403 and toll switch 407. These requests include requests to set up a facility connection between some large customer and a toll switch for providing access by that customer to the public switched network or to a switched private network; to set up facilities connections between two customer locations; to set up facilities connections between a customer location and another DACS for further connection to another customer location, another DACS or another toll switch; to set up facilities connections between an input of a DACS and an output of a DACS for providing a connection for a facility passing through the DACS; to set up facilities connections between an incoming facility and the toll switch for providing switched connections for the public switched network; and to set up facilities connections between facilities to a local switch and facilities to a toll switch. The administration of DACS switches must be coordinated so that if, for example, a particular facility is to be routed without switching from New York to Los Angeles, the facility is connected through each intermediate DACS along the route.

The toll administration system 405 is used to send control messages over link 415 to toll switch 407. These control messages define the role of each of the facilities connected to the toll switch 407 so that the destination of each facility terminating on the toll switch is defined within the toll switch 407 and that the trunk groups connected to that facility are properly identified in terms of that destination.

Figure 2:
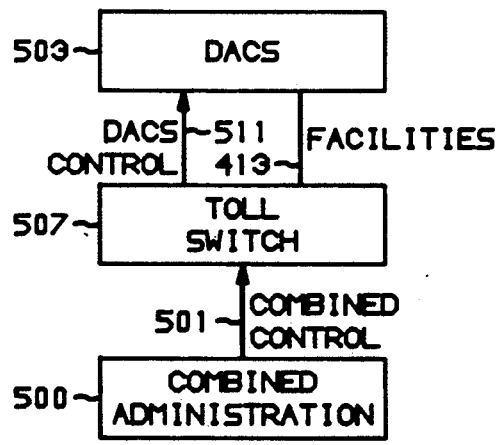
FIG. 2 illustrates the configuration in accordance with the principles of this invention.

FIG. 2 shows how the configuration of FIG. 1 is changed in accordance with the principles of this invention. A combined administration system 500 sends a combined control message to a modified toll toll switch. The modified toll switch comprises memory and programs for controlling the DACS as well as the toll switch Toll switch 507 then sends DACS control messages over link 511 to DACS 503 arranged for control from the toll switch 507. The facilities 413 interconnecting the DACS 503 and toll switch 507 are unchanged from the facilities interconnecting DACS switch 403 and toll switch 417 of the configuration of FIG. 1. In addition, toll switch 507 can generate its own control messages to DACS 503 based on signaling messages received by toll switch 507, based on toll switch 507's analysis of traffic, and its analysis of messages received from other toll switches reflecting facility outrage or emergency traffic conditions. In response to these messages and toll switch 507's own traffic analysis, toll switch 507 sends a series of pre-planned, or, alternatively, program-derived, DACS control messages over link 511 to change the configuration of the DACS to meet the special needs of the network because of special traffic conditions or facilities outages.

Figure 3:
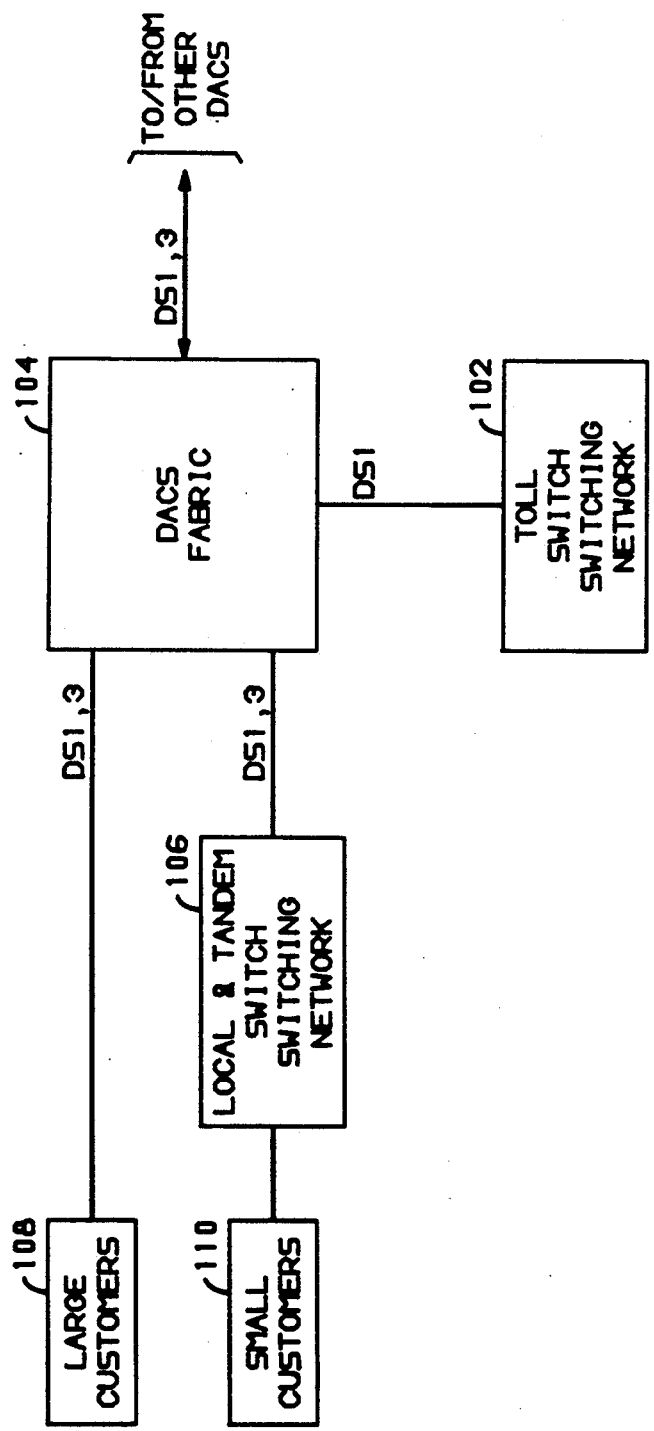
FIG. 3 is a block diagram showing interconnections among DACS, toll and local switches, and customers.

FIG. 3, representing the prior art as well as the configuration for this invention, is block diagram illustrating the interconnections between customers, local and tandem switches, the digital access and cross connect system (DACS), and toll switches. The small customers 110 are connected to toll switches 102 via one or more local and tandem switches 106 and a DACS 104. Large customers 108 may be directly connected to DACS 104, thence to the toll switch 102. The toll switch 102 performs all of its switching at a 64 kilobit digital signal 0 (DS0) level and is connected to the DACS via signals at a 1.544 megabit rate, the digital signal 1 (DS1) rate. Each DS1 signal carries 24 DS0 signals. The DACS is arranged to handle both DS1 signals and digital signaling which are at a 45 megabit rate and comprise 28 DS1 channels. In relatively rare circumstances, the local or tandem switch may go directly to the toll switch 102 via a DS1 facility, but in general all facilities to toll switch switching network 102 are from an associated DACS 104 which offers flexibility by allowing DS1 facilities to be interconnected. The DACSs are connected to other DACSs for carrying the long haul traffic of the toll switching network and these other DACSs are then in turn connected to other toll switch switching networks similar to 102, and to large customer premises similar to 108 and local or tandem switches similar to 106. Large customers can directly access the DACS in order to bypass the switching performed by the local and tandem switching network when the services provided by this network are not required. The facilities from these large customers may be either private lines, i.e., connections which are not switched but terminate to another large customer premises location, or switched network access lines for giving large customers access to the toll switch switching network 102 for connection to other locations of the large customer.

A DS1 facility interconnecting a DACS and a toll switch is generally connected within the toll switch to a bundled group of 24 trunks which are all or part of a trunk group having a common destination. The DS1 input is converted in the toll switch into 24 DS0 signals, each representing one speech channel or one data channel. A DS3 facility interconnecting two DACSs is broken up into DS1 facilities prior to connection to the toll switch which can treat each incoming DS1 facility as a separate bundled group of trunks. The DS1 and DS3 facilities interconnecting two DACSs may be carried over much larger bandwidth facilities such as a fiber optic pair which can carry many DS3 facilities.

In rare instances, the two switches interconnected by a DS1 facility treat the 24 channels as being members of two separate trunk groups, used for accessing different destinations.

Figure 4:
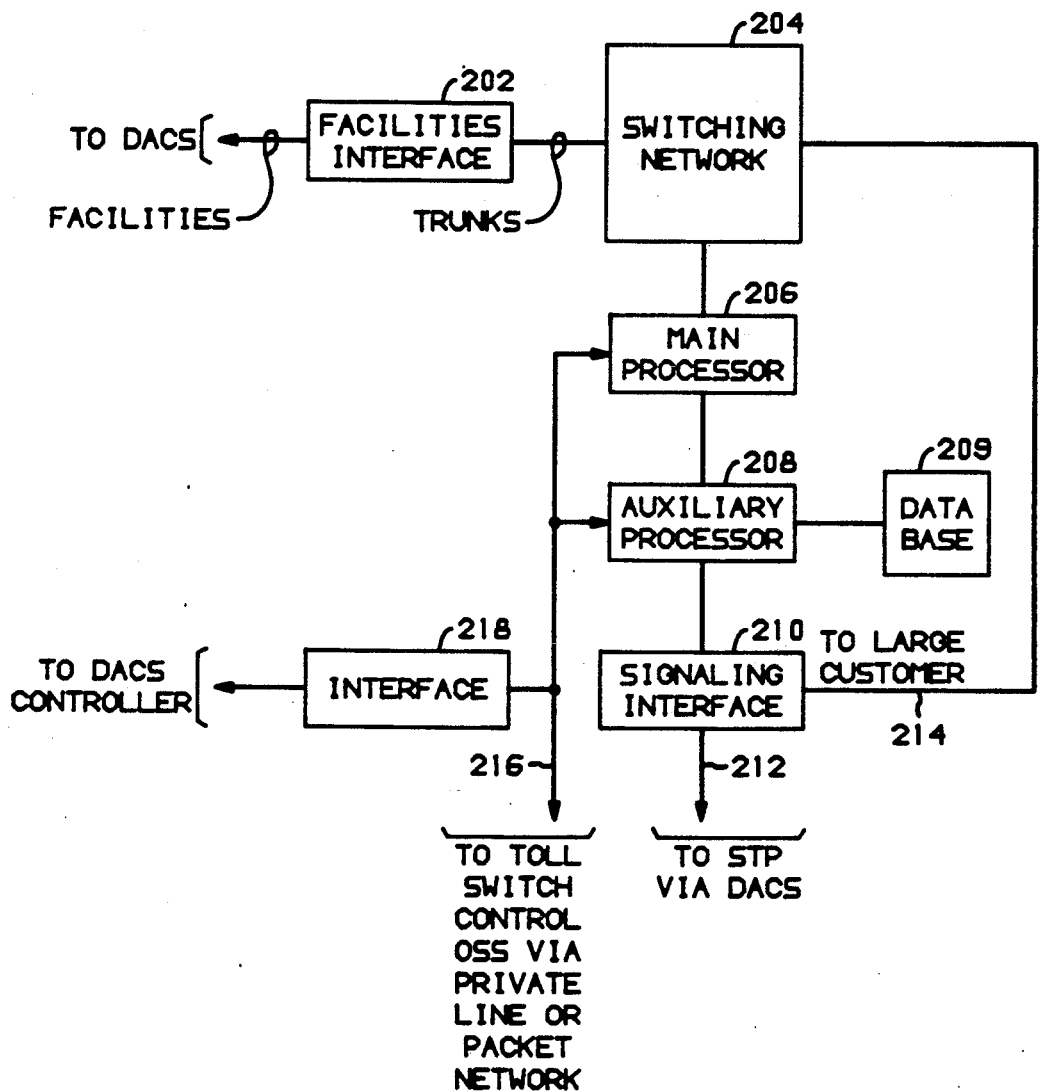
FIG. 4 is a diagram of a toll switch.

FIG. 4 is a block diagram of a toll switch such as the 4 ESS TM toll switch described in *The Bell System Technical Journal*, Vol. 56, No. 7, pages 1015–1320, September 1977. It is connected to a DACS via a facility interface 202 for accepting facility DS1 signals from the DACS and delivering DS0 signals to a switching network 204. The DS1 signals are derivable from DS3 or other higher bandwidth facility signals of the DACS, and are switched in the DACS to provide transmission facilities to the connected toll switch, local switch or private customer. The DS0 signals are trunk signals switched individually within the switching network 204 of the toll switch. Switching network 204 is controlled by a main processor 206 which communicates with an auxiliary processor 208 having an attached data base 209. The auxiliary processor communicates with a signaling interface 210. This interface is connected to signal transfer points via connection 212 for passing signals necessary for setting up connections and is connected to a terminal of one of a large customers via a connection 214 that traverses the switching network and the DACS. The connection 214 is used to enable the large customer to signal directly to the toll switch when the customer wishes to establish a private line connection or change the private line or private network configuration. In addition, the toll switch is connected via connections 216 that terminate on the auxiliary processor or the main processor to operation support systems (OSSs) for controlling the toll switch via either a private line connection or a packet network. These operation support systems provide the data to the toll switch for establishing routing patterns, setting up trunk groups, delivering measurement reports from the toll switch to operation support systems for billing and for proper operation of the network.

Figure 5:
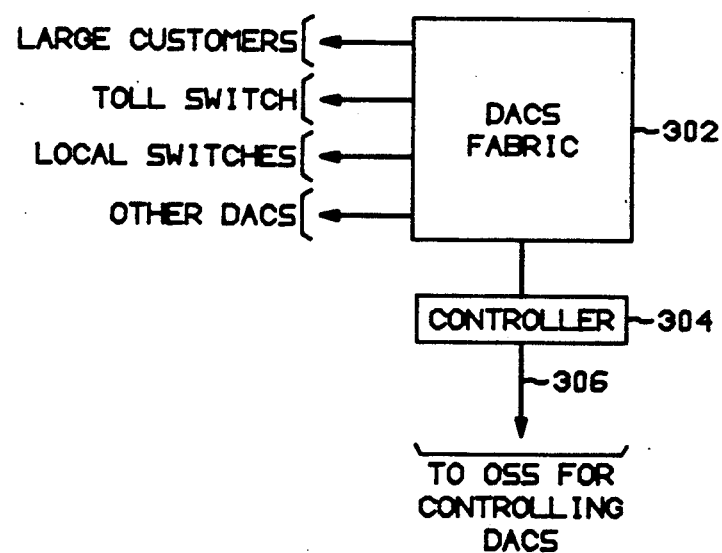
FIG. 5 is a diagram showing inputs to a DACS.

FIG. 5, representing the prior art, is a block diagram of a DACS showing a DACS fabric 302 connected to large customers, toll switches, local switches, and to other DACSs. The DACS switching fabric is under the control of a controller 304 which in turn communicates with a group of OSSs for controlling the DACS via a connection 306. In the prior art, these DACS OSSs which supply the data necessary to establish connections in a DACS are a completely separate set of OSSs from the OSSs used for controlling operations in the toll switch. DACS OSSs receive inputs from customers requesting connection of facilities and receive requests from connecting local and from connected local switches requesting connection of facilities between the local switch and the associated toll switch. The DACS terminates all the facilities that have been installed in a particular area, many of which are not in use at any one time. In response to a request from a local switch or a private customer, communicated to an OSS by a service order, one of these facilities that interconnects the appropriate points is selected and connected via the DACS fabric to the toll switch. In other cases, a DACS facility is connected to another DACS that is connected to another toll switch. If an additional facility is needed between the two toll switches, each of the DACS establishes a connection so that the previously unused facility is now used to interconnect the two toll switches.

As can be seen from the above descriptions, the DACS which controls the switching of facilities and the toll switch which controls the connections set up over these facilities are in the prior art controlled completely independently, even to the extent of receiving their basic control inputs from separate operation support systems. By merging the control of the DACS and the toll switch, it is possible to create a system which has a far greater flexibility in the use of the facilities interconnecting the DACS. Thus, it is possible to respond to network facility outages readily detected in the toll switches by switching to alternate facilities. Similarly, it is possible to rearrange facilities to handle special traffic peaks such as those encountered in the case of facilities failures by reallocating facilities to different routes. Further, by combining the OSSs that control the DACS with the OSSs that control the toll switch, it is possible to substantially reduce the operating costs for these OSSs. Further, by having an integrated control of the DACS and the toll switch, it is possible to permit those large customers who use both private network services and public network services to have a single interface for signaling their requests for changes in either or both the toll switch and the DACS.

Figure 6:
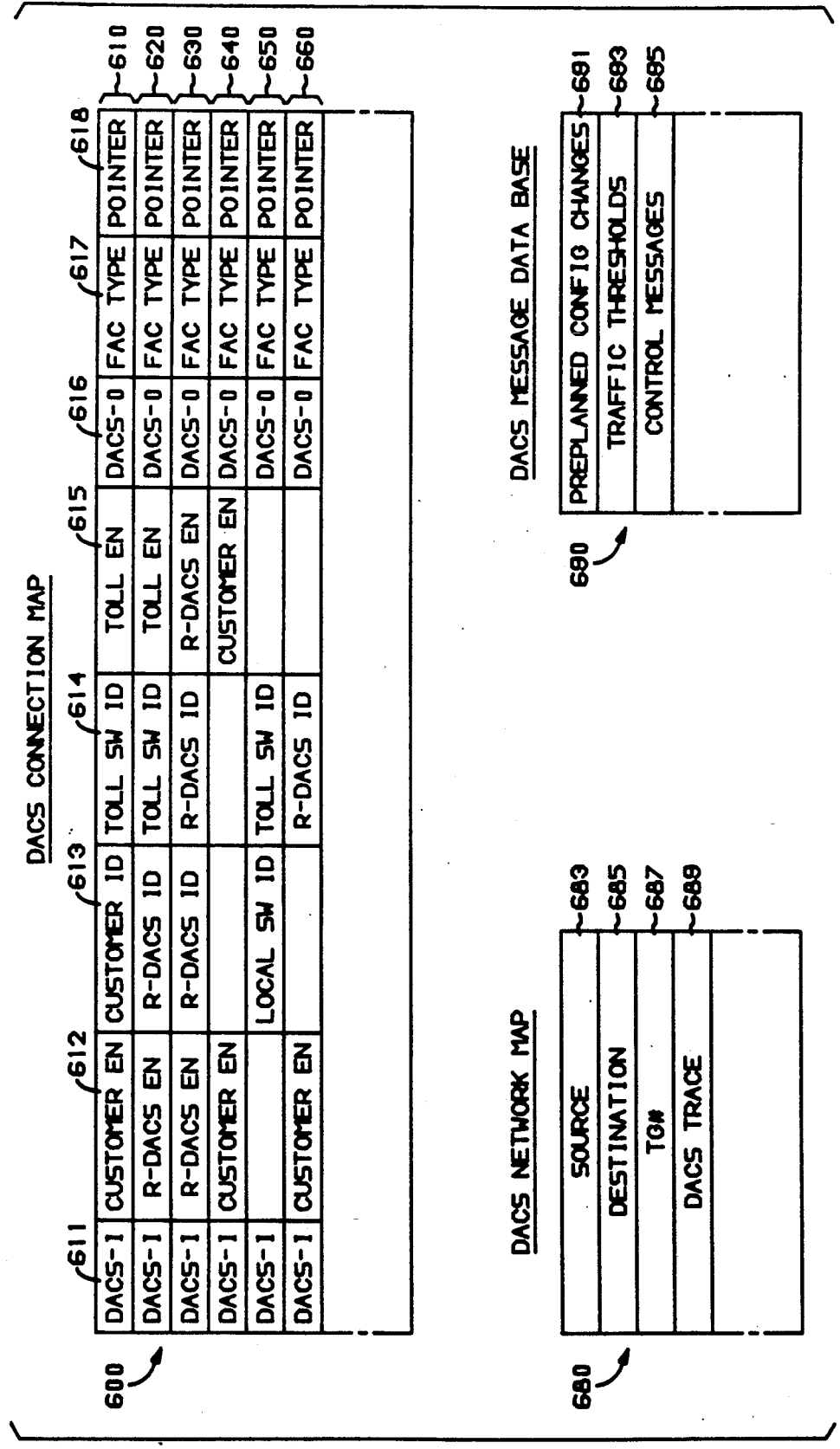
FIG. 6 is a memory layout of memory in a toll switch for implementing the invention.

FIG. 6 is a diagram of memory layouts in the toll switch for controlling DACS connections. Block 600 is a record of existing DACS connections. For each connection set up in the DACS, eight segments of a record such as 610, 620, 630, 640, 650, and 660, are used to describe the connection. Within record 610, segments 611 and 616 specify the input and output terminal of the connection within the DACS. Segments 612 and 613 represent an equipment number and an identification for the facility connected to the DACS input terminal. In the example of record 610, this is a customer equipment number (i.e., an equipment identification of the terminal on the customer's premises to which the DACS input terminal is connected) and an identification of the customer. Segments 614 and 615 specify the identification and equipment number of the terminal to which the DACS output terminal is connected. In the case of record 610, this is an identification of the connected toll switch and the equipment number within that toll switch. Segment 617 identifies a type of facility (for example, DS1 or DS3) and segment 618 is a pointer to a block such as auxiliary block 680 which contains additional information.

Shown in FIG. 6 are examples of memory layouts for different DACS connections. Record 610 is for a customer to toll switch connection; record 620 is for a connection between a toll switch and another (remote) DACS; record 630 is for a connection between two remote DACSs; record 640 is for a connection between two premises of a customer; record 650 is for a connection between a local or tandem switch and a toll switch; and record 660 is for a connection between a customer and a remote DACS.

A typical auxiliary block 680 contains an identification of the source and destination, i.e., the two ends that are connected by facilities interconnected by one or more DACSs, a trunk group identification for identifying the trunk group in the toll switch that is carried by the facility, and a trace of the DACSs connecting the source and destination and of the equipment locations within those DACSs that are connected. This block can be used so that a controlling toll switch may request a change in use of a facility by sending appropriate requests for controlling other DACSs that are in series with the facility to other toll switches controlling those DACSs.

FIG. 6 shows another block 690 used for storing data for pre-planned configuration changes. For example, if it is recognized by the network administration staff that if a particular facility fails, a series of facility reconfigurations is required, then such information can be stored in one of the toll switches used for controlling the DACS. This toll switch receives a message indicating that the subject facility has failed. In response to receipt of this message, a pre-planned series of control messages 695 are sent to toll switches for controlling the DACS associated with those facilities which require reconfiguration. Reconfiguration may also be performed in response to measurement by the system that traffic exceeds or is less than certain pre-planned thresholds; in response to the recognition of this state, a pre-planned series of facility reconfigurations should be performed. The control messages can be stored directly or can be derived by program means.

Figure 7:
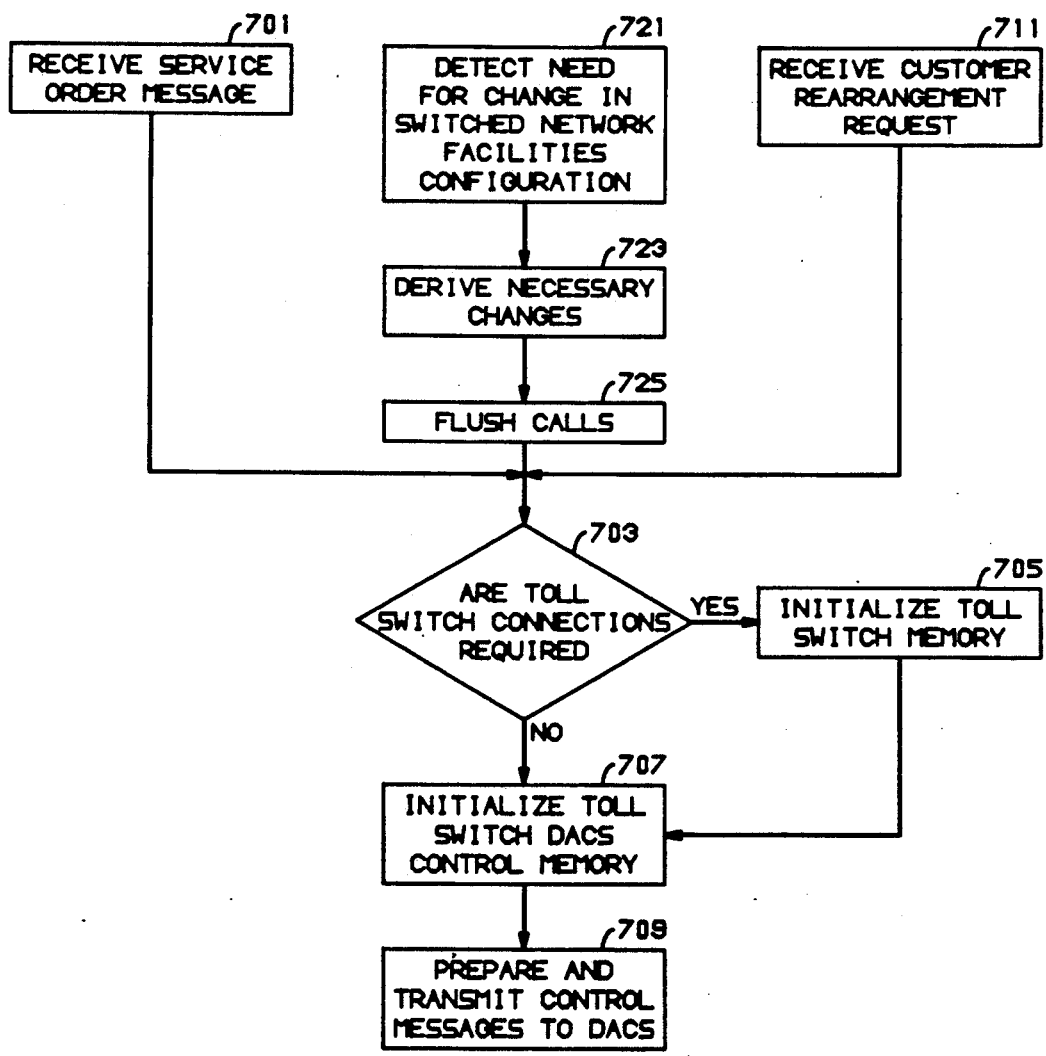
FIG. 7 is a flow diagram of a program for a toll switch for implementing the invention.

FIG. 7 is a flow diagram of actions performed under the control of control processors of the toll switch for controlling an associated DACS. The toll switch receives a service order message (action block 701). This message is analyzed to see if it requires a connection within the toll switch. Such a connection may be required if, for example, only a DS0 channel is to be provided for a given customer (the DACS 3 and DACS 4 systems, for example, cannot switch DS0 channels). If the service order represents the creation of a new trunk group for serving customer dialed calls, then toll switch connections are also required in connection with this service order. In either such case, the toll switch memory must be initialized, in one case to reflect a semi-permanent connection, in the other case to create the information representing the new trunk group (action block 705). Next, the control memory (previously described with respect to FIG. 6) must be initialized in the toll switch to reflect the required DACS connections (action block 707). Messages for requesting these DACS connections are then prepared and transmitted to the DACS (action block 709) in order that the DACS set up the connections specified by the service order.

As indicated previously, the configuration of the present invention is sufficiently flexible so that it can respond to requests other than service orders. The toll switch can receive customer rearrangement request messages to rearrange facilities interconnections for customers with large private networks and to rearrange these facilities either through DACS switches or through connections set up within the toll switch or through a combination of both. The same basic arrangement is used for setting up the connections as previously described.

In addition as previously described, the toll switch can detect conditions from received messages indicating a facilities outage or some other reason for requesting a facilities reconfiguration (action block 721). This request is then converted into a plan of the necessary changes in the DACS and in one or more toll switches (action block 723). As indicated above, in the present configuration these changes are stored as a series of pre-planned messages for requesting changes in the DACS. Alternatively, the controller function for the DACS may be absorbed completely into the switch, and the DACS control messages become direct memory writes for establishing or disconnecting specific paths in the DACS switching fabric.

Alternatively, traffic algorithms can be used to derive the changes independently. If the changes involve different assignments of facilities connected to the toll switch, then it may be necessary to flush calls from trunk groups currently using facilities which are being reconfigured (action block 725) by refusing all new calls for the facility until all the existing calls have ended. Thereafter, the same actions previously described for initializing the toll switch memory, the DACS control memory, and transmitting control messages to the DACS are performed.

With the configuration in accordance with the principles of this invention, the number of DACS switch operations performed per unit time is increased substantially and is likely to be increased even further as full advantage is taken of this arrangement. It is therefore necessary to modify the control link to the DACS controller to allow for a higher volume of control messages. The control link to the DACS controller is connected either to the output of the auxiliary processor 208 (FIG. 5) or directly to the interface bus 216 connected to both the main processor and the auxiliary processor 208. The capacity of the interface bus 216 is higher so that this is the preferred long term solution. Further, in order to increase the number of connections that can be made by the DACS, it is desirable to preprocess the connections orders and send to the DACS specific connection requests. This preprocessing is performed by the auxiliary processor 208 in response to service order messages from the operation support system.

While in this specific embodiment, a toll switch is used to control the DACS, it is also possible to control the DACS similarly from a local or tandem switch.

The description which follows relates to the integration of an interconnection arrangement, e.g., a DACS, with a local central office switching system. In the specific embodiment described, the interconnection arrangement is based generally on the AT&T DACS IV digital access and crossconnect system described in the publication AT&T 365-301-004"DACS IV (Digital Access and Crossconnect System IV); the central office switching system is based generally on the AT&T 5ESS ® Switch described in the *AT&T Technical Journal*, July-August 1985, Vol. 64, No. 6, Part 2. The description is arranged in three parts: (1) the AT&T 5ESS Switch is described as it exists in the prior art; (2) modifications and additions to the 5ESS Switch are then described which provide the integration of an interconnection arrangement with a switching system, under a common control structure, in a central office wire center CO-2000 (FIGS. 11a and 11b); and (3) a further embodiment (FIG. 12) is then described where the interconnection arrangement is implemented using add/-drop multiplexers connected in a fiber ring in a distributed architecture rather than using a DACS.

Prior Art System 1000

Figure 8:
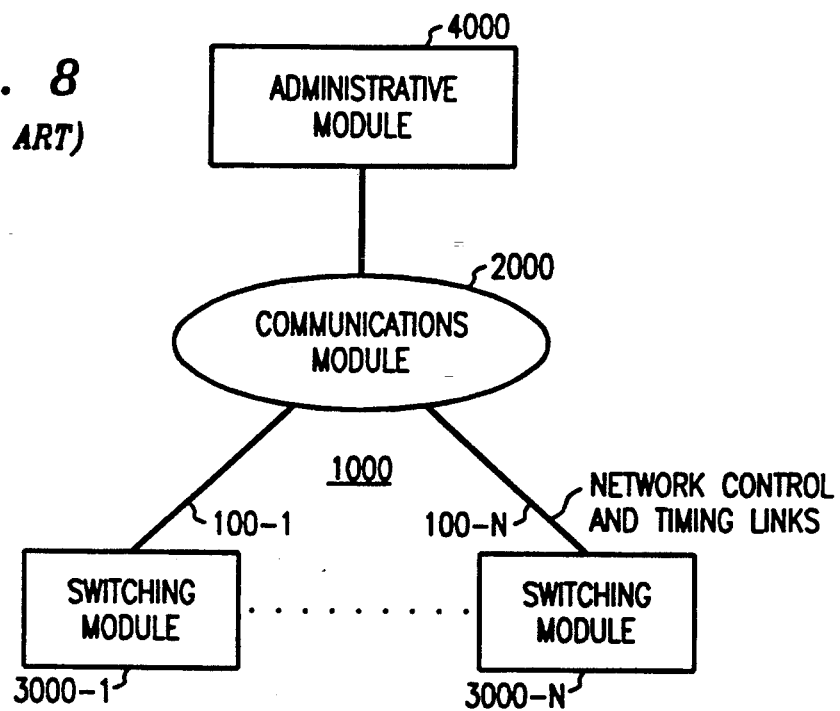
Figure 9:
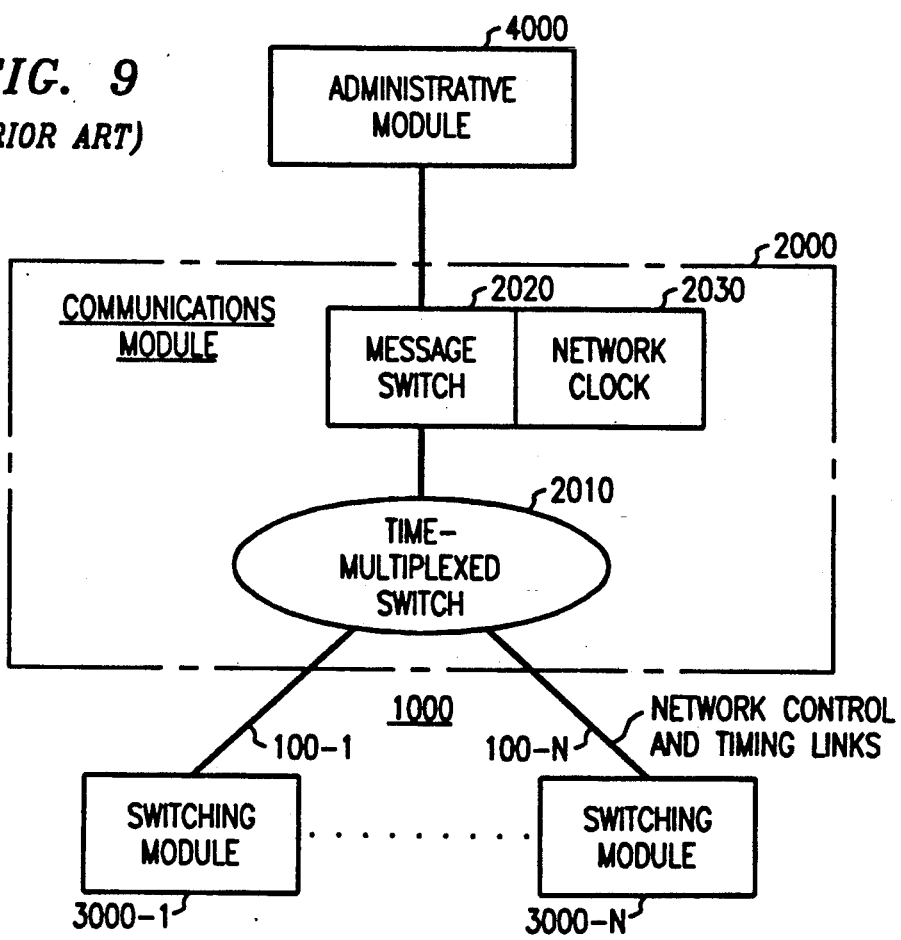

FIGS. 8-10 are used to describe the prior art switching system 1000. U.S. Pat. No. 4,323,843 issued to H. J. Beuscher et al. on Mar. 30, 1982 and U.S. Pat. No. 4,683,584 issued to S. Chang et al. on Jul. 27, 1987 describe aspects of the system in detail.

Switching system 1000 (FIG. 8) has three major components: an administrative module (AM) 4000 that provides systemwide administration, maintenance, and resource allocation; a communications module (CM) 2000 that provides a hub for distributing and switching voice or digital data, control information, and synchronization signals; and a number of switching modules (SMs) 3000-1, 3000-N that perform local switching and control functions and that provide interfaces to subscriber lines and interexchange circuits.

AM 4000 provides the system-level interfaces required to operate, administer, and maintain system 1000. It performs functions that can most economically be done globally, such as common resource allocation and maintenance control. For reliability, AM 4000 includes fully duplicated processors and the two processors work in an active/standby configuration. In normal operation the active processor has control and, at the same time, keeps the data in the standby processor up to date. Thus when a fault occurs in the active processor, the standby processor is switched into service with no loss of data.

AM 4000 performs many call-processing support functions, including systemwide craft maintenance access, diagnostic and exercise control and scheduling, software recovery and initialization, and certain fault-recovery and error-detection functions best done on a centralized basis. Within AM 4000, there is error-checking circuitry for detecting and isolating faults. AM 4000 also performs administrative functions and provides software access to external data links and to disk storage (not shown).

The basic function of CM 2000 (FIG. 9) is to provide consistent communications between the SMs, and between AM 4000 and the SMs. A message switch (MSGS) 2020 transfers call-processing and administrative messages between the SMs and AM 4000, and between any two SMs. MSGS 2020 performs a packet-switching function within system 1000 utilizing the well-known X.25 level-2 protocol to transfer control messages through CM 2000 and its terminating network control and timing (NCT) links 100-1, 100-N. This protocol includes error detection, positive message acknowledgment, and message retransmission in the event of a transmission error. A network clock 2030 provides the clock signals that synchronize the time-division network. Clock 2030 is synchronized through an external source or runs on an internal reference basis with periodic updating.

System 1000 uses a time-space-time architecture. As illustrated in FIG. 10, a time-slot interchange unit (TSIU) in each SM performs the time-division switching; a time-multiplexed switch (TMS) 2010 in CM 2000 (FIG. 9) performs the time-shared space-division switching. At each interface unit (FIG. 10) the outputs from lines and trunks are converted into 16-bit time slots. These bits are used for signaling, control, and parity, and for binary-coded voice or data. The time slots are switched through the TSIU and time-multiplexed on NCT links to TMS 2010.

TMS 2010 (FIG. 9) is a single-stage switching network that provides the digital paths for switched connections between the modules and for control messages among modules. TMS 2010 interconnects the modules via the NCT links. Each NCT link carries 256 channels (time slots) of multiplexed data in a 32.768-Mb/s serial bit stream. One of the time slots carries control messages, and the remaining 255 time slots carry digitized voice or data. Two NCT links are associated with each switching module, thus allowing 512 time slots to be routed to and from TMS 2010. (However, only a single line 100-1 is shown in the drawing to represent both NCT links between SM 3000-1 and CM 2000.) Setting up a path between a line or trunk on two SMs involves finding an idle time slot on one of the NCT links to each SM. A path is then set up through TMS 2010 between the two NCT links using the selected time slot. The TSIU in each SM establishes a path between the selected NCT time slot and the peripheral time slot associated with the line or trunk. (Since the paths are bidirectional, one NCT time slot is needed for each direction of transmission. In the present embodiment however, the time slots for the two directions are selected to have the same number.)

One of the signaling bits of the 16-bit time slots on the NCT links to TMS 2010, referred to as the E-bit, is used for continuity verification between SMs after an inter-SM call has been set up through TMS 2010. For example, after a call between SM 3000-1 and SM 3000-N has been set up through TMS 2010 using a particular time slot, both SM 3000-1 and SM 3000-N begin transmitting a logic one E-bit in the particular time slot as a continuity signal and both also begin scanning the E-bit of the particular time slot received from the other SM. The call setup procedure is not considered complete until both SM 3000-1 and SM 3000-N have detected the E-bit continuity signal from the other SM.

SMs such as SM 3000-1 (FIG. 10) provide call-processing intelligence, the first stage of switching network, and line and trunk terminals. SMs differ in the types and quantities of interface equipment they contain, depending upon the characteristics of the lines or trunks terminating thereon. Certain equipment is however, common to all SMs. The common equipment includes a link interface 3030, a TSIU 3010, and a module control unit 3020. Link interface 3030 provides a two-way interface between each SM and TMS 2010 in CM 2000. Module control unit 3020 controls call processing, call distribution, and maintenance functions. A variety of interface units 3041, 3042 are available in system 1000. Line units provide interfaces to analog lines. Trunk units provide interfaces to analog trunks. Digital line trunk units provide interfaces to digital trunks and remote SMs, while digital carrier line units provide the interface to digital carrier systems. Integrated services line units provide interfaces to digital ISDN lines. Each SM can accommodate any mixture of these units, with up to 510 channels. Two time slots are used for control.

TSIU 3010 includes a signal processor, which handles address and signaling information and a control interface, which distributes control signals to and from the interface units. TSIU 3010 switches time slots between the interface units in an SM and connects time slots from the interface units to time slots on NCT links. TSIU 3010 switches 512 time slots—256 from each of the NCT links between SM 3000-1 and CM 2000—and 512 peripheral time slots from the interface units. TSIU 3010 can connect any of its 512 peripheral time slots to any other peripheral time slot, or to any time slot of either NCT link to CM 2000.

Central Office Wire Center CO-2000

Figure 11A:
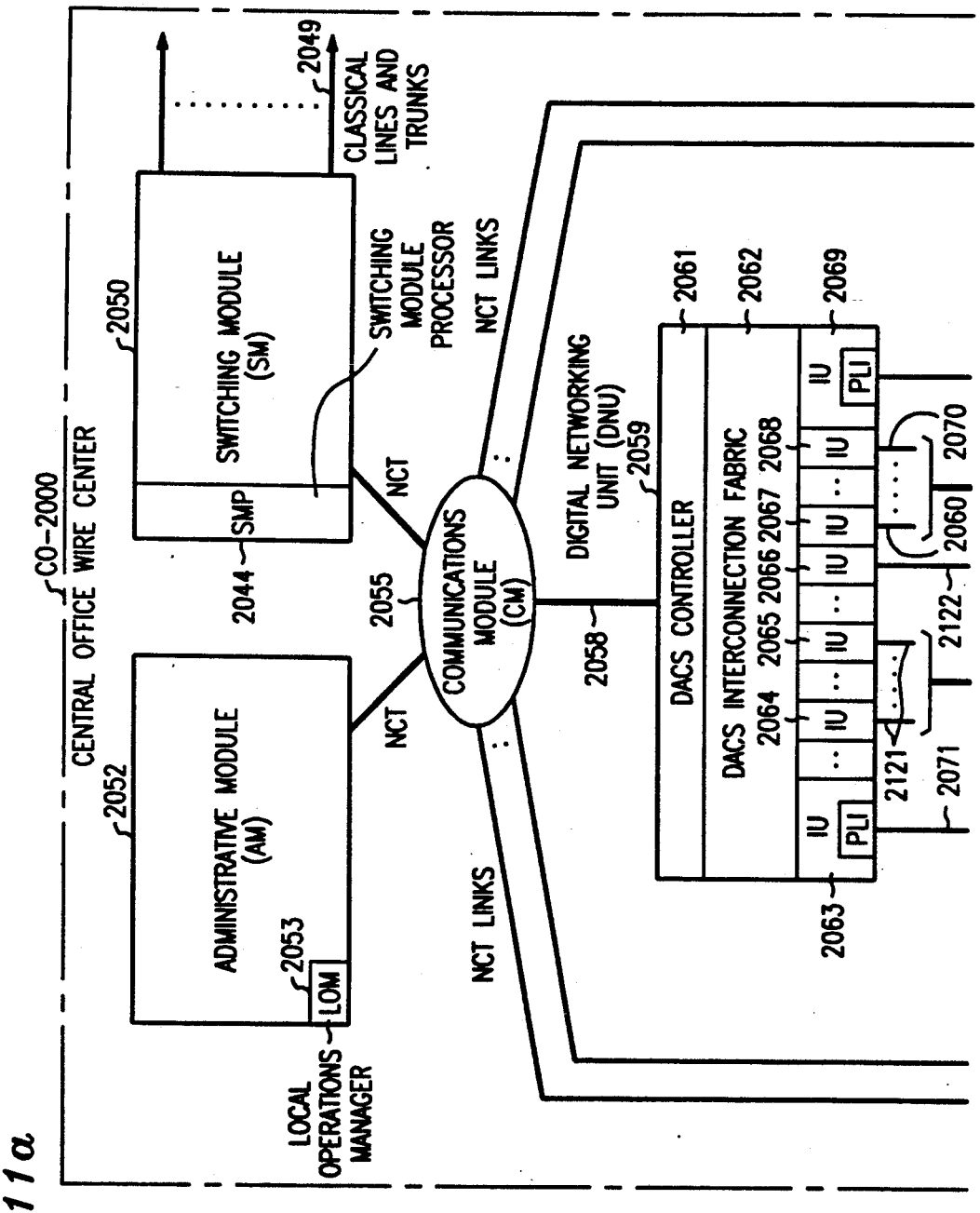
FIGS. 11a and 11b, arranged in accordance with FIG. 11, comprise a diagram illustrating modifications and additions to the switching system of FIGS. 8-10 to provide the integration of an interconnection arrangement (a DACS) with a switching system, under a common control structure, in central office wire center CO-2000.
Figure 11B:
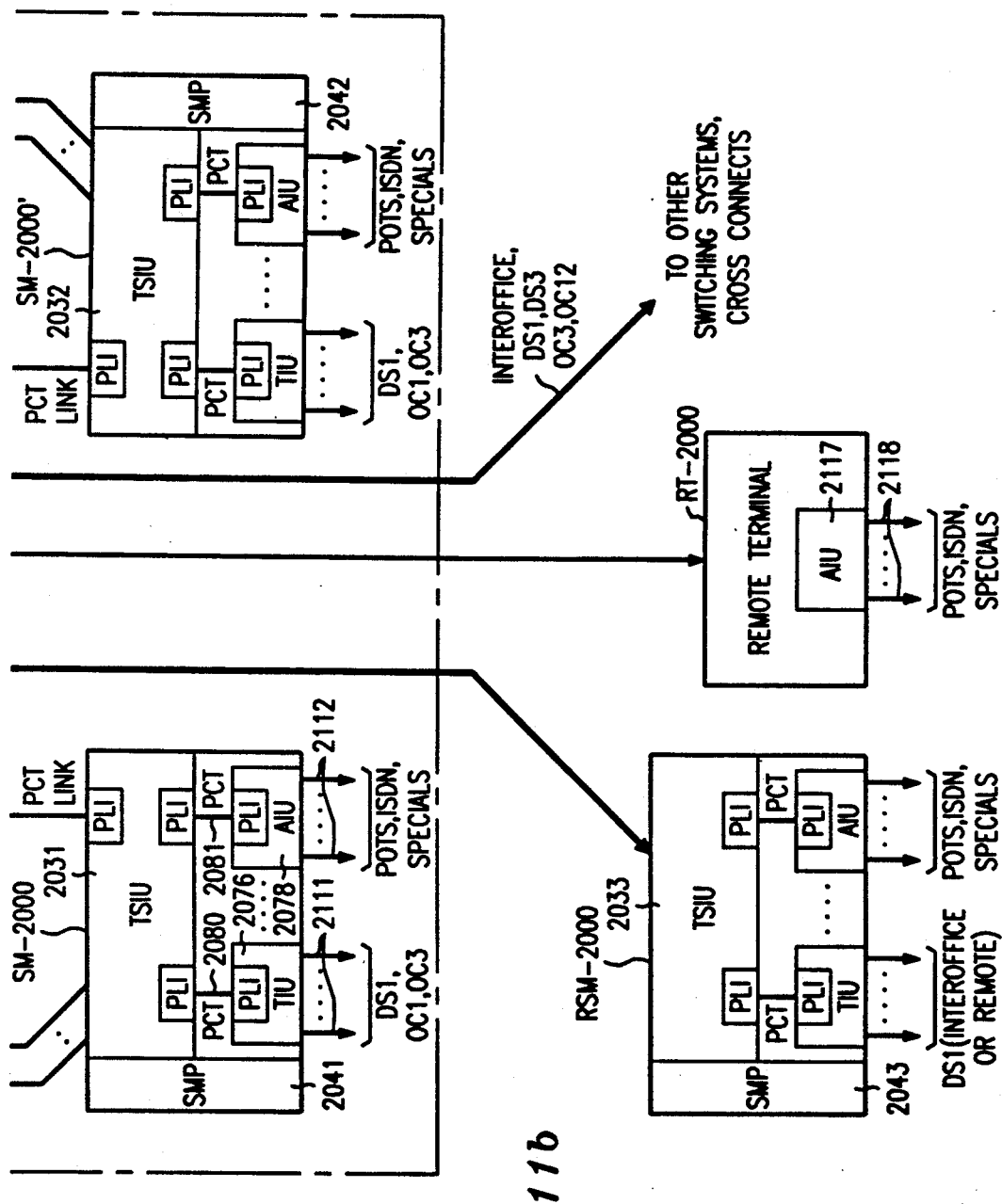

FIGS. 11a and 11b comprise a diagram of an architecture for a central office wire center CO-2000 where a switching system and a DACS are integrated under the common control of an administrative module (AM) 2052. In FIGS. 11a and 11b, the DACS functionality is implemented by a digital networking unit (DNU) 2059. The other elements in FIGS. 11a and 11b are elements of a switching system based on the architecture of system 1000 (FIG. 8) but with modifications and additions as described herein.

CO-2000 includes one or more switching modules, SM-2000, SM-2000', which, like the conventional switching modules of the prior art system, perform time-switching functions under the control of a distributed module control unit or switching module processor (SMP) 2041, 2042. However, switching modules SM-2000 and SM-2000' are substantially larger than conventional switching modules and can switch approximately 16K peripheral time slots and 16K network time slots. Also included as part of the switching system is a remote switching module RSM-2000, controlled by SMP 2043, and a remote terminal RT-2000, both located at a distance from CO-2000, and interconnected with CO-2000 via fiber links 2121 and 2122. Conventional switching modules such as SM 2050 controlled by SMP 2044 and providing service to lines and trunks 2049, may also be included in the same system.

SM-2000 includes a time-slot interchange unit (TSIU) 2031 which switches time slots between interface units connected via peripheral control and timing (PCT) links 2080, 2081, 2071, and connects time slots from the peripheral interface units to time slots on network control and timing (NCT) links 2056 to communications module 2055. Access interface unit (AIU) 2078 provides the system interface to lines 2112 including POTS (plain old telephone service), ISDN (integrated services digital network) and special lines 2112. AIU 2078 provides the typical functionality (battery, overvoltage, ringing, supervision, coding/decoding, hybrid, testing) for analog lines, and terminates the standard B and D channels for ISDN lines. Special lines include lines to private branch exchanges, foreign exchanges, etc. Trunk unit (TIU) 2076 provides the system interface to trunks 2111 at DS1 and OC-1/OC-3 rates (Table 1). The PCT links are terminated at both ends by peripheral link interfaces (PLIs). Note that DNU 2059 is connected as a peripheral unit.

TRANSMISSION RATES

DS-0 = 1 voice circuit = 64 kb/s
DS-1 = 24 voice circuits = 1.544 Mb/s
DS-3 = 672 (28×24) voice circuits = 44.736 Mb/s
OC-1 = 672 voice circuits = STS-1 = 51.84 Mb/s
OC-3 = 2016 (3×672) voice circuits = STS = 155.520 Mb/s
OC-12 = 8064 (4×2016) channels = STS-12 = 622.080 M/bs
VT1.5 = 1.728 Mb/s Sonet envelope containing a DS1 rate signal.

Table 1

In the present exemplary embodiment, the NCT and PCT fiber optic links transmit data at an OC-3 rate and each comprise 2016 time slots. (Alternatively, three links at an OC-1 rate may replace one link at an OC-3 rate.) The number of NCT links is engineered dependent on the amount of inter-module traffic. SM-2000 can connect any of its peripheral time slots to any other peripheral time slot, or to any of the network time slots on NCT links 2056. Within CM 2055, a given NCT link 2056 is divided into lines each comprising 256 time slots, for switching by a time-multiplexed, space-division switch to the other switching modules.

DNU 2059, based on the above-referenced DACS IV, includes a DACS controller 2061, which operates in response to commands from AM 2054 via CM 2055 and data link 2058, to control the operation of a DACS interconnection fabric 2062. Fabric 2062 has a plurality of ports and provides crossconnections between ports at DS1, DS3, OC-3 and OC-12 rates, for example, among interface units such as units 2063-2069. DNU 2059 is used to perform conventional crossconnection functions, performed by separate DACS systems in the prior art, such as interconnecting DS1s between other switching systems and crossconnect systems. DNU 2059 also interconnects DS1 multiplexes from transmission facilities 2060, 2070 via PCT links to SM-2000 and SM-2000' for DS0 switching. In some applications, all inter-office trunks may be received by DNU 2059 rather than by TIUs within SM-2000 or SM-2000'. DNU 2059 is also used to interconnect remote terminal RT-2000, via a fiber link 2122 in accordance with Bellcore Technical Reference TR303, with SM-2000. The number of PCT links between DNU 2059 and SM-2000 is engineered based on the required traffic.

DNU 2059 is usable to provide semi-permanent connectivity between SM-2000 and SM-2000' for use in handling some of the inter-module call traffic, without requiring the use of the individually switched connections through CM 2055. For example, in one alternative all inter-module calls are routed through DNU 2059, and CM 2055 is used only when the semi-permanent connectivity through DNU 2059 is all being used for other calls.

RT-2000 includes an AIU 2117 for interfacing POTS, ISDN, and special lines 2118 with time slots on link 2122. AIU 2117 has time slot interchange capability such that a group of 24 special lines, for example, are combined within a single DS1 multiplex on link 2122 and crossconnected by DNU 2059 with a transmission facility to another switching system, without being switched through SM-2000. Lines 2118 may include metallic and/or optical fiber lines. AIU 2117 operates as a digital loop carrier system in the manner of the AT&T SLC® carrier systems. All the circuits from RT-2000 that are to be individually switched by SM-2000 are crossconnected via fabric 2062 to interface unit 2063, which performs framing functions and terminates a derived data link for control messages from AIU 2117. Interface unit 2063 also performs overhead processing for SONET streams received via facilities 2060, 2070. The message processing from such streams is performed by SMP 2041.

RSM-2000, which is substantially identical to SM-2000, is connected via fiber links 2121 and DNU 2059 to SM-2000 which operates as a host switching module in the manner described in U.S. Pat. No. 4,550,404 issued to M. M. Chodrow et al., on Oct. 29, 1985. Alternatively, RSM-2000 may be connected directly via links 2121 to CM 2055 for operation as an optical remote module.

AM 2052 performs the functions of AM 4000 (FIG. 8) of the prior art system, and further includes a processor referred to as a local operations manager (LOM) 2053 to interface operations support systems (OSSs) for both switching systems and crossconnect systems as well as to the craft interface used in controlling, in an integrated fashion, the operations, administration, maintenance, and provisioning (OAM&P) functions, for both the switching system and the interconnect arrangement (DNU 2059).

An illustrative method of the invention is used in a central office wire center CO-2000 (FIGS. 11a and 11b) including an interconnect arrangement (DNU 2059) terminating transmission facilities (2060, 2070), and further including a switching system including peripheral units (AIUs, TIUs) for interfacing peripheral circuits (lines, trunks) with the switching system. The switching system also includes switching units (TSIUs 2031, 2032) for providing switched communication among the peripheral circuits in response to calls to and from the peripheral circuits. The wire center further includes a control means (AM 2052) common to the interconnect arrangement and the switching system. In response to the control means, the interconnect arrangement interconnects the switching system and at least one multiplex of circuits (e.g., a DS1 multiplex comprising 24 circuits) of at least one of the transmission facilities. Also in response to the control means, the switching system establishes calls to and from individual circuits of that multiplex.

The interconnect arrangement also interconnects units of the switching system. For example, the interconnect arrangement interconnects a peripheral unit (AIU 2117) at a remote terminal (RT-2000) and a switching unit (TSIU 2031) at the central office wire center. Alternatively, the interconnect arrangement interconnects a peripheral unit and a switching unit that are both located at the central office wire center. The interconnect arrangement is usable to interconnect two switching units, e.g., a host switching unit (TSIU 2031) at the central office wire center and a remote switching unit (TSIU 2033) at a distance from the wire center, or two distributed switch units (TSIUs 2031, 2032) at the wire center. The switching system further includes a central switch (CM 2055) for providing switched communication between different switching units (TSIUs 2031, 2032).

An illustrative combination in accordance with the invention comprises a switching system, an interconnect means (DNU 2059), and control means (AM 2052) common to the switching system and the interconnect means. The switching system selectively interconnects ones of a plurality of communication circuits (DS0 circuits). The interconnect means selectively interconnects ones of a plurality of communication multiplexes (e.g., DS1 multiplexes each comprising 24 DS0 circuits). A first of the multiplexes (a DS1 on PCT link 2071) is connected to the switching system. The control means controls both the interconnection by the interconnect means of ones of the multiplexes, and the establishment by the switching system of calls to and from individual ones of the circuits of the first multiplex.

The control means includes a common operations, administration, maintenance, and provisioning system for the switching system and the interconnect means. The interconnect means has a plurality of ports (connected to IUs 2063-2069) and interconnect control means (DACS controller 2061) for controlling the interconnection of the ports. The interconnect means and the switching system are colocated at a central office wire center (CO-2000).

A second multiplex (a DS1 on link 2122) conveys information to and from peripheral communication circuits (lines 2118). The control means controls the interconnection by the interconnect means of the first and second multiplexes, and the establishment by the switching system of calls to and from individual ones of the peripheral circuits via the first multiplex, the interconnect means, and the second multiplex.

A third multiplex (a DS1 on link 2060) and a fourth multiplex (a DS1 on link 2070) are not connected to the switching system. The control means controls the interconnection of the third and fourth multiplexes. The third and fourth multiplexes may be connected to other switching systems and interconnect means that are independent of the control means.

Add/Drop Fiber Ring Architecture

Figure 12:
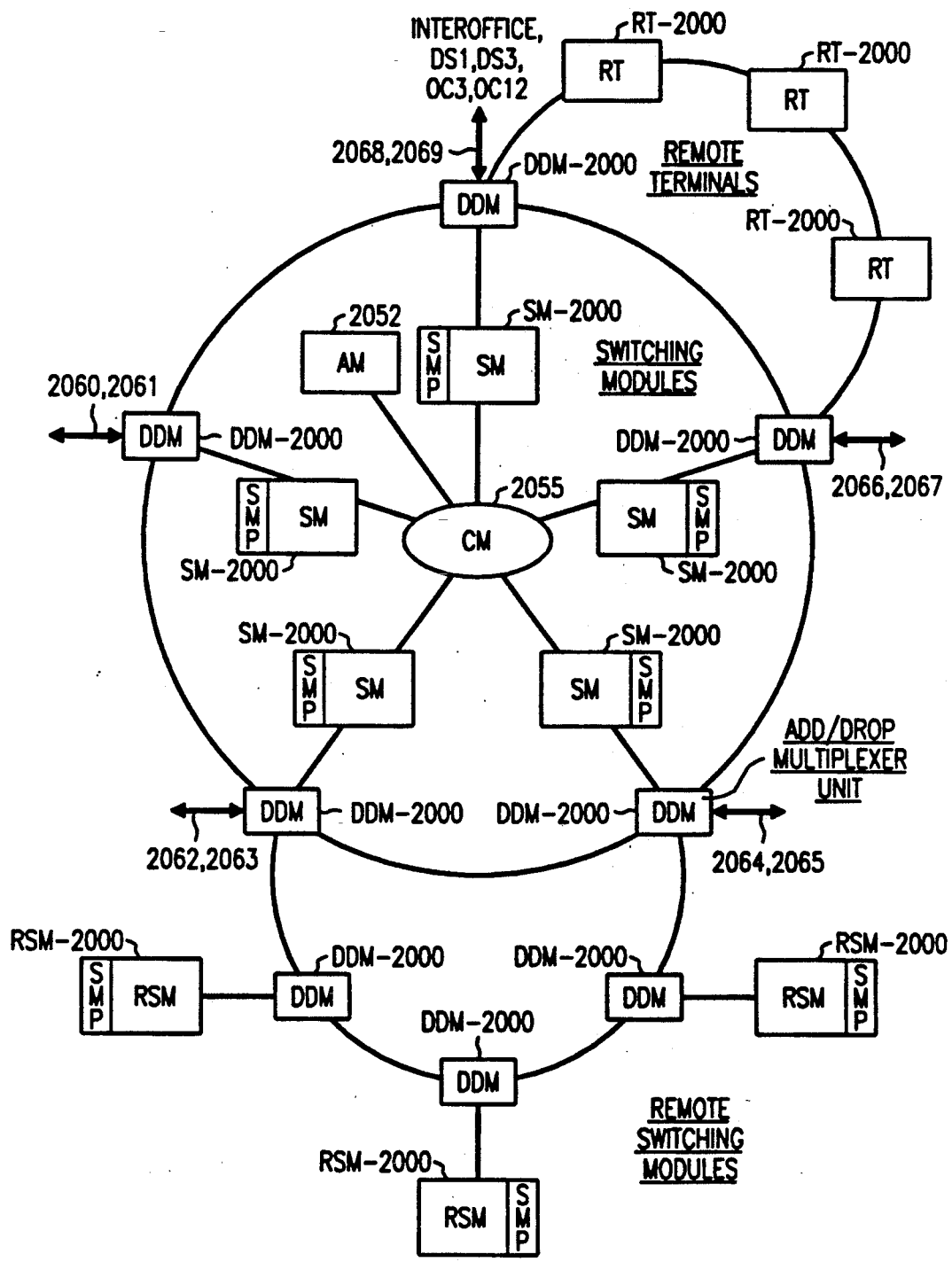
FIG. 12 is a diagram of an add/drop fiber ring architecture where the interconnection arrangement is implemented using add/drop multiplexers connected in a fiber ring in a distributed architecture rather than using a DACS.

FIG. 12 is a diagram of an alternative to the architecture of FIGS. 11a and 11b. In FIG. 12, the function of the interconnect arrangement, (performed by DNU 2059 in FIGS. 11a and 11b) is performed by a plurality of add/drop multiplexer units DDM-2000 interconnected in a ring. In the present example, the ring operates at an OC-12 rate. A multiplexer unit DDM-2000 is used to receive transmission facilities, e.g., 2060, 2061, at DS1, DS3, OC-3 and OC-12, and performs bandwidth shedding, add/drop multiplexing, and SONET overhead processing as required. The add/drop functionality of a particular unit DDM-2000 is programmed by the SMP of the associated SM-2000, under the overall control of AM 2052. DS1 multiplexes received on transmission facilities 2060-2069, or from remote terminals RT-2000 or remote switching modules RSM-2000, are connectable via the ring to any one of the SM-2000s for switching. The crossconnection of multiplexes may by performed within the DDM-2000s or the SM-2000s.

ALTERNATIVE EMBODIMENT

Central Office Wire Center CO-3000

Figure 13A:
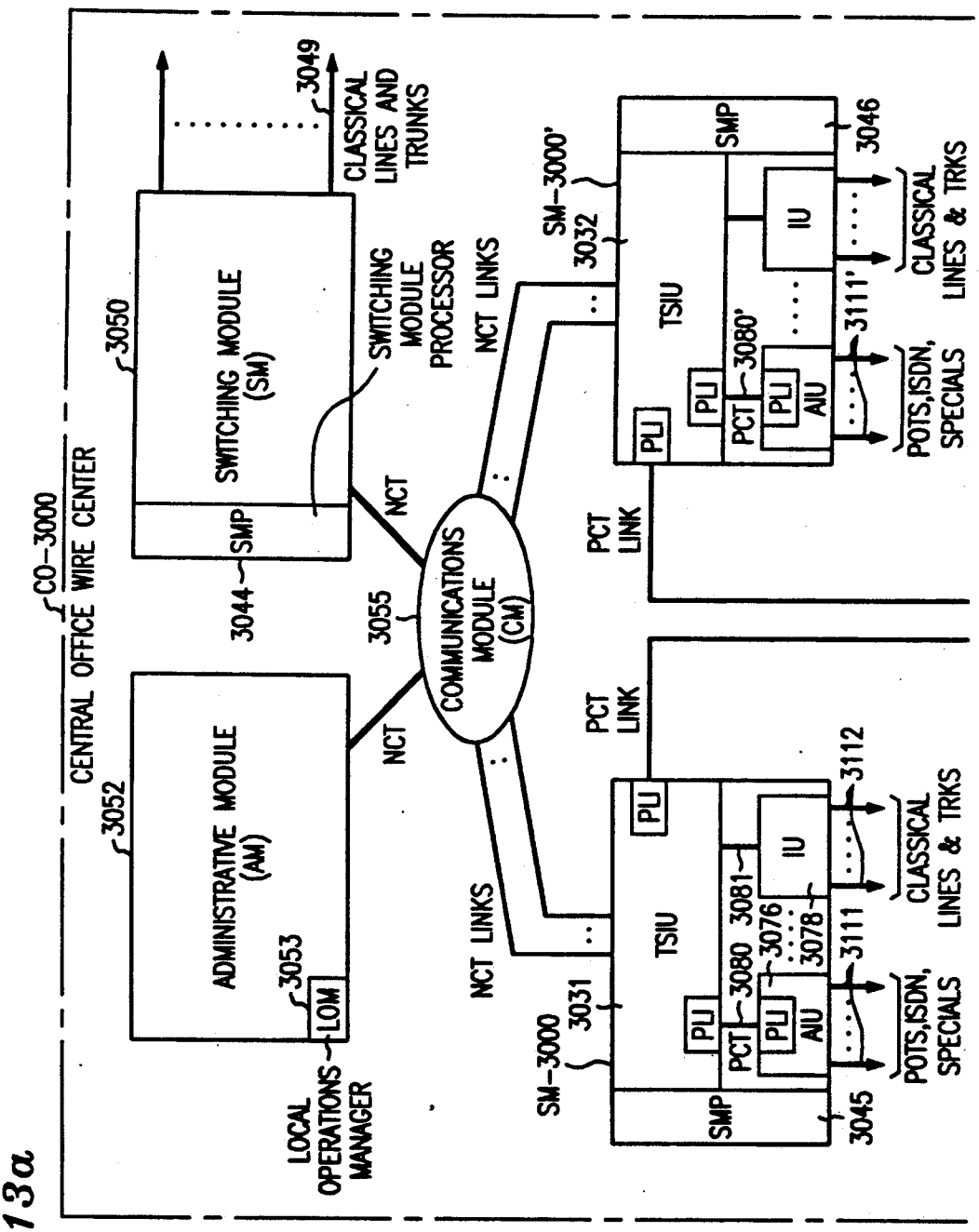
FIGS. 13a, 13b, 13c arranged in accordance with FIG. 13 comprise a diagram of a further alternative embodiment illustrating modifications and additions to the switching system of FIGS. 8-10 to provide the integration of an interconnection arrangement (a DACS) with a switching system, under a common control structure, in a central office wire center CO-3000.
Figure 13B:
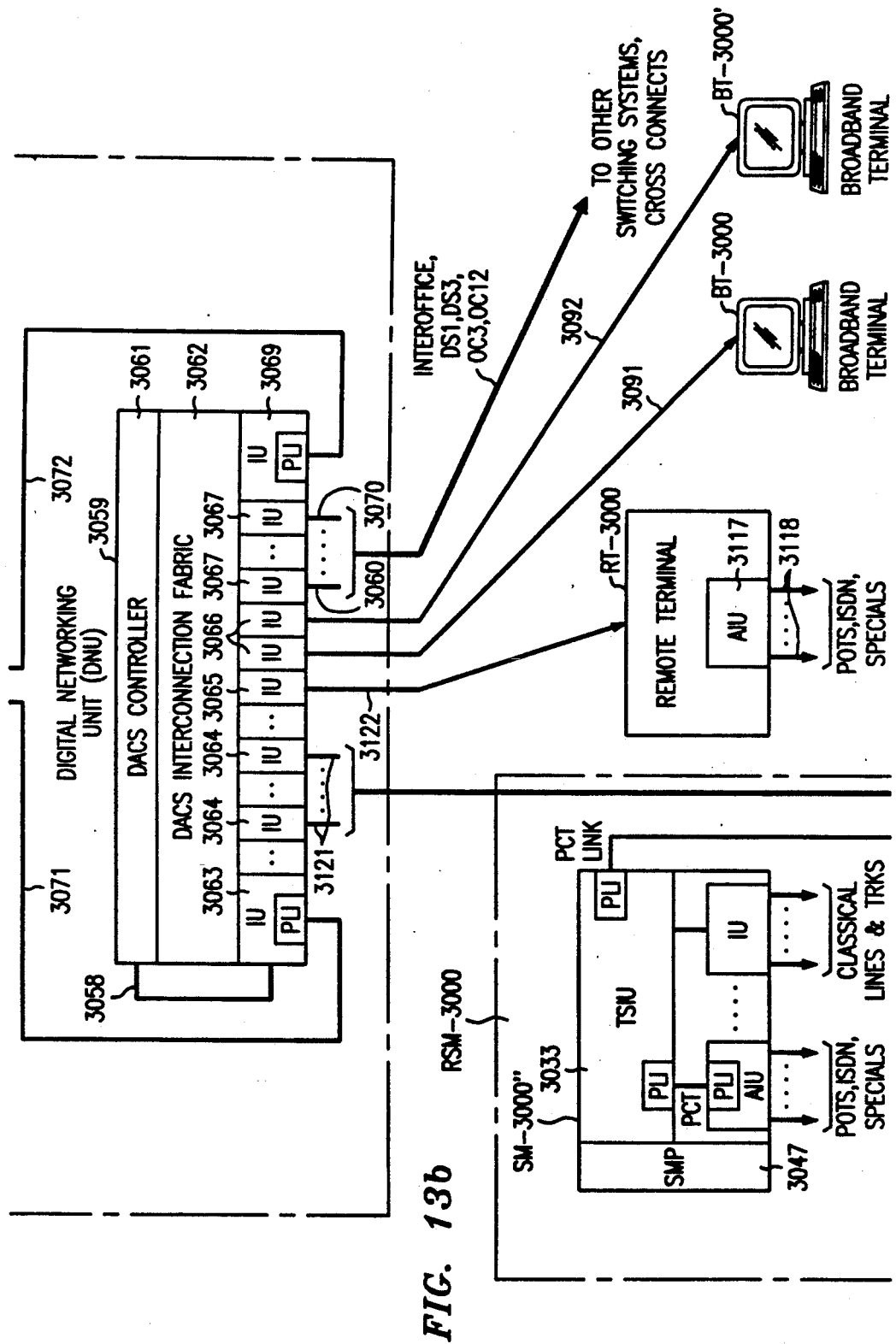
Figure 13:
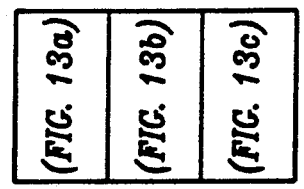
Figure 13C:
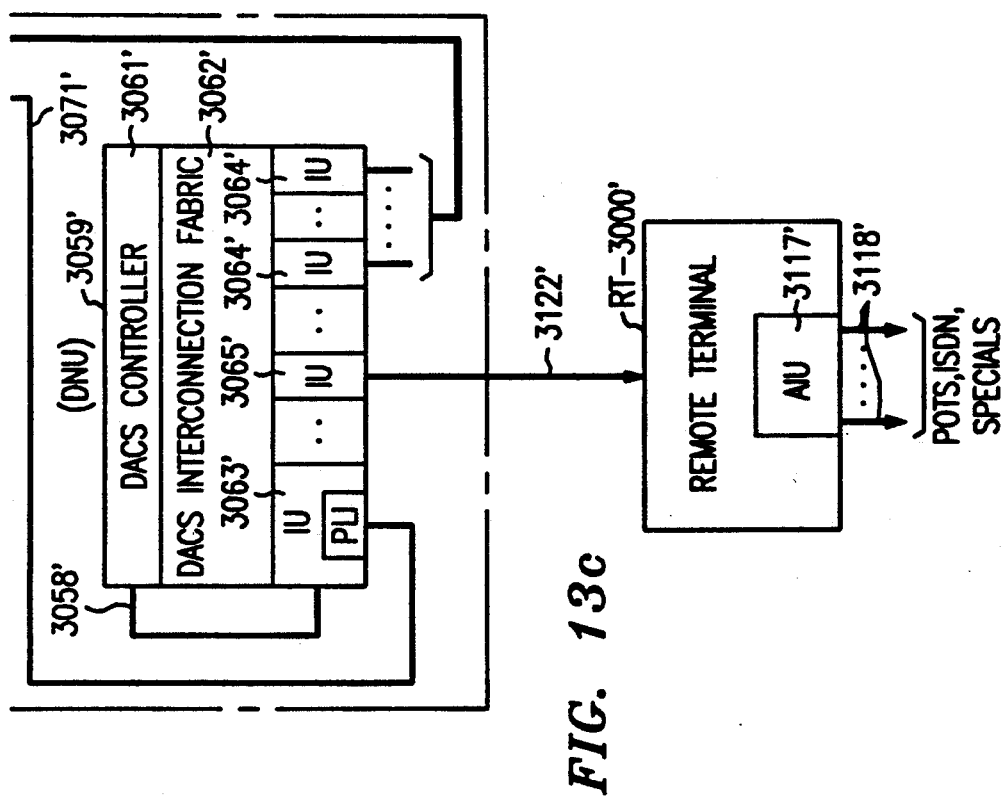

FIGS. 13a, 13b, and 13c comprise a diagram of an architecture for an alternative embodiment of a central office wire center CO-3000 where a switching system and a DACS are integrated under the common control of an administrative module (AM) 3052. In FIGS. 13a, 13b, and 13c, the DACS functionality is implemented by a digital networking unit (DNU) 3059. The other elements in FIGS. 13a, 13b, and 13c are elements of a switching system based on the architecture of system 1000 (FIG. 8) but with modifications and additions as described herein.

CO-3000 includes one or more switching modules, SM-3000, SM-3000', which, like the conventional switching modules of the prior art system, perform time-switching functions under the control of a distributed module control unit or switching module processor (SMP) 3045, 3046. However, switching modules SM-3000 and SM-3000' are substantially larger than conventional switching modules and can switch approximately 16K peripheral time slots and 16K network time slots. Also included as part of the switching system is a remote switching module RSM-3000, controlled by SMP 3047, and a remote terminal RT-3000, both located at a distance from CO-3000, and interconnected with CO-3000 via fiber links 3121 and 3122. A second remote terminal RT-3000' is located at a distance from RSM-3000 and is interconnected therewith via fiber link 3122'. Conventional switching modules such as SM 3050 controlled by SMP 3044 and providing service to lines and trunks 3049, may also be included in the same system.

SM-3000 includes a time-slot interchange unit (TSIU) 3031 which switches time slots between interface units, e.g., access interface unit (AIU) 3076 connected via peripheral control and timing (PCT) link 3080, and interface unit 3078 representing one of the line and trunk units of the prior art system (FIG. 10) and described in the referenced AT&T Technical Journal, July-August 1985, Vol. 64, No. 6, Part 2. TSIU 3031 connects time slots from the peripheral interface units to time slots on network control and timing (NCT) links to communications module 3055. AIU 3076 provides the system interface to lines 3111 including POTS (plain old telephone service), ISDN (integrated services digital network) and special lines. AIU 3076 provides the typical functionality (battery, overvoltage, ringing, supervision, coding/decoding, hybrid, testing) for analog lines, and terminates the standard B and D channels for ISDN lines. Special lines include lines to private branch exchanges, foreign exchanges, etc. The PCT links, e.g., 3080, 3071, are terminated at both ends by peripheral link interfaces (PLIs). Note that DNU 3059 is connected as a peripheral unit.

In the present exemplary embodiment, the NCT and PCT fiber optic links transmit data at approximately 65 megahertz and each comprise 1024, eight-bit time slots. The number of NCT links is engineered dependent on the amount of intermodule traffic. SM-3000 can connect any of its peripheral time slots to any other peripheral time slot, or to any of the network time slots on NCT links. Within CM 2055, a given NCT link is divided into lines each comprising 256 time slots, for switching by a time-multiplexed, space-division switch to the other switching modules.

DNU 3059, based on the above-referenced DACS IV, includes a DACS controller 3061, which operates in response to commands from SMP 3045 via PCT link 3071, interface unit 3063, and control link 3058, to control the operation of a DACS interconnection fabric 3062. The control communication between SMP 3045 and DACS controller 3061 uses one or more reserved time slots from TSIU 3031 on PCT link 3071. Fabric 3062 has a plurality of ports and provides crossconnections between ports at DS1, DS3, OC-3 and OC-12 rates, for example, among interface units such as units 3063–3069. DNU 3059 is used to perform conventional crossconnection functions, performed by separate DACS systems in the prior art, such as interconnecting DS1s between other switching systems and crossconnect systems. DNU 3059 also interconnects DS1 multiplexes from transmission facilities 3060, 3070 via PCT links to SM-3000 and SM-3000' for DS0 switching. DNU 3059 is also used to interconnect remote terminal RT-3000, via a fiber link 3122 in accordance with Bellcore Technical Reference TR303, with SM-3000. The number of PCT links between DNU 3059 and SM-3000 is engineered based on the required traffic.

DNU 3059 is usable to provide semi-permanent connectivity between SM-3000 and SM-3000' for use in handling some of the inter-module call traffic, without requiring the use of the individually switched connections through CM 3055. For example, in one alternative, all inter-module calls are routed through DNU 3059, and CM 3055 is used only when the semi-permanent connectivity through DNU 3059 is all being used for other calls.

DNU 3059 is also usable to provide real-time, switched broadband connections between broadband terminals BT-3000 and BT-3000'. DS1 is sometimes referred to as "wideband" and DS3 as "broadband", while standard 64 kilobits per second voice channels are referred to as "narrowband". Herein, the term "broadband" refers to a bandwidth greater than that of the standard 64 kilobits per second voice channels. In response to a call request for a real-time, switched broadband connection between broadband terminals BT-3000 and BT-3000', SMP 3045 controls, via DACS controller 3061, the DACS interconnection fabric 3062 to interconnect the interface units 3066 connected to broadband terminals BT-3000 and BT-3000' via broadband links 3091 and 3092 respectively. Illustratively, the call requests are receivable on the broadband links 3091 and 3092.

RT-3000 includes an AIU 3117 for interfacing POTS, ISDN, and special lines 3118 with time slots on link 3122. AIU 3117 has time slot interchange capability such that a group of 24 special lines, for example, are combined within a single DS1 multiplex on link 3122 and crossconnected by DNU 3059 with a transmission facility to another switching system, without being switched through SM-3000. Lines 3118 may include metallic and/or optical fiber lines. RT-3000 operates as a digital loop carrier system in the manner of the AT&T SLC ® carrier systems. All the circuits from RT-3000 that are to be individually switched by SM-3000 are crossconnected via fabric 3062 to interface unit 3063, which performs framing functions and terminates a derived data link for control messages from AIU 3117. Interface unit 3063 also performs overhead processing for SONET streams received via facilities 3060, 3070. The message processing from such streams is performed by SMP 3045.

RSM-3000 comprises SM-3000" and DNU 3059'. SM-3000", which is substantially identical to SM-3000, is connected via DNU 3059' fiber links 3121, and DNU 3059 to SM-3000, which operates as a host switching module in the manner described in U.S. Pat. No. 4,550,404 issued to M. M. Chodrow et al., on Oct. 29, 1985. Alternatively, SM-3000" may be connected directly via links 3121 to CM 3055 for operation as an optical remote module.

DNU 3059', which is substantially identical to DNU 3059, includes a DACS controller 3061', which operates in response to commands from SMP 3047 via PCT link 3071', interface unit 3063', and control link 3058', to control the operation of a DACS interconnection fabric 3062'. Fabric 3062' has a plurality of ports and provides crossconnections between ports at DS1, DS3, OC-3 and OC-12 rates, for example, among interfaces units such as units 3063', 3064', 3065'. DNU 3059' is used to interconnect remote terminal RT-3000', via a fiber link 3122' in accordance with Bellcore Technical Reference TR303, with SM 3000". The number of PCT links between DNU 3059' and SM-3000" is engineered based on the required traffic.

Remote terminal RT-3000', which includes an AIU 3117' for interfacing POTS, ISDN, and special lines 3118' with time slots on link 3122', is substantially identical to remote terminal RT-3000.

AM 3052 performs the functions of AM 4000 (FIG. 8) of the prior art system, and further includes a processor referred to as a local operations manager (LOM) 3053 to interface operations support systems (OSSs) for both switching systems and crossconnect systems as well as to the craft interface used in controlling, in an integrated fashion, the operations, administration, maintenance, and provisioning (OAM&P) functions, for both the switching system and the interconnect arrangement (DNU 3059).

An illustrative combination (FIGS. 13a, 13b, 13c) in accordance with the invention comprises a switching system, an interconnect means (DNU 3059), and control means (AM 3052, SMP 3045) common to the switching system and the interconnect means. The switching system selectively interconnects ones of a plurality of communication circuits (DS0 circuits). The interconnect means selectively interconnects ones of a plurality of communication multiplexes (e.g., DS1 multiplexes each comprising 24 DS0 circuits). A first of the multiplexes (a DS1 on PCT link 3071) is connected to the switching system. The control means controls both the interconnection by the interconnect means of ones of the multiplexes, and the establishment by the switching system of calls to and from individual ones of the circuits of the first multiplex.

Illustratively, the switching system comprises a plurality of distributed switch means (SM-3000, SM-3000'). The first multiplex (e.g., a DS1 on PCT link 3071) is connected to a first one of the distributed switch means (SM-3000) and a second multiplex (e.g., a DS1 on PCT link 3072) is connected to a second distributed switch means (SM-3000'). A third multiplex (on PCT link 3080) conveys information to and from lines (3111), and a fourth multiplex (on PCT link 3080') conveys information to and from lines (3111'). The control means controls the interconnection by the interconnect means (DNU 3059) of the first and second multiplexes, and of the third and fourth multiplexes, and the establishment by the switching system of calls to and from individual ones of the lines 3111 and calls to and from individual ones of the lines 3111'. AM 3052 cooperates with SMP 3045 to control DNU 3059.

The switching system includes first switching means located at a central office (CO-3000) and second switching means (SM-3000") at a remote location (RSM-3000). The interconnect means (DNU 3059) is colocated with the first switching means at the central office. Illustratively, the combination further includes interconnect means (DNU 3059') colocated with the second switching means at the remote location.

The interconnect means (e.g., DNU 3059) also selectively interconnects first and second broadband links 3091 and 3092, where broadband link 3091 is connectable to broadband terminal BT-3000 and broadband link 3092 is connectable to broadband terminal BT-3000'. The control means responds to a call request for a realtime, switched broadband connection between broadband terminals BT-3000 and BT-3000' by controlling the interconnect means to interconnect broadband links 3091 and 3092.

It is to be understood that the above description is only of preferred embodiments of the invention. Numerous other arrangements may be devised by one skilled in the art without departing from the spirit and scope of the invention. The invention is thus limited only as defined in the accompanying claims.

We claim:

1. In an automatic digital crossconnection system for establishing connections between facilities each comprising a plurality of communication channels, said crossconnection system connected to and serving a communications switching system, a method of establishing crossconnections comprising the steps of:

in said switching system, detecting a requirement for a crossconnection between two of said facilities each comprising a plurality of communication channels in said crossconnection system;

responsive to said detecting, transmitting a data message comprising data for establishing said crossconnection to said crossconnect system; and responsive to receiving said message, establishing said crossconnection in said digital crossconnection system.

2. The method of claim 1 wherein said detecting comprises:

receiving in said switching system a customer rearrange request message from a customer.

3. The method of claim 1 wherein said detecting comprises:

receiving in said switching system a service order message from an operations support system.

4. The method of claim 1 further comprising:

in said switching system, responsive to call establishment request signals, establishing calls over circuits of said facilities.

5. The method of claim 4 wherein said detecting comprises:

receiving in said switching system a message from a traffic control system.

6. The method of claim 4 wherein said detecting comprises:

receiving in said switching system a message from another switching system.

7. The method of claim 4 wherein said detecting comprises:

detecting in said switching system a traffic condition requiring a charge in use of facilities.

8. The method of claim 1 wherein said crossconnection is for a private network using facilities of a common carrier network.

9. The method of claim 1 further comprising:

responsive to receiving said message, updating control memory in said switching system for recording a connection of said crossconnection system.

10. The method of claim 4 wherein said crossconnection is for a public switched service of a common carrier network.

11. The method of claim 4 wherein said request crossconnection supplies additional trucks for a group in said switching system further comprising:
responsive to receiving said message, updating trunk memory of said switching system to record additional trunks of said group.

12. The method of claim 4 wherein said detecting comprises:
receiving in said switching system a customer rearrange request message from a customer.

13. The method of claim 4 wherein said detecting comprises:
receiving in said switching system a service order message from an operations support system.

14. The method of claim 4 further comprising:
responsive to receiving said message, updating control memory in said switching system for recording a connection of said crossconnection system.

15. A communications switching system comprising:
data reception means for receiving a data message;
processor means, responsive to said data message, for generating a control message for controlling automatic establishment of a crossconnection in a crossconnect system for interconnecting facilities each comprising a plurality of channels; and
data transmission means for transmitting said control message toward said crossconnect system for establishing said crossconnection.

16. A communications switching system comprising:
means for switching calls on individual channels of facilities connected to a crossconnect system;
data reception means for receiving a data message;
processor means, responsive to data message, for controlling said switching means and for generating a control message for controlling automatic establishment of a crossconnection, for a facility comprising a plurality of circuits connected to said switching system, in said crossconnect system; and
data transmission means for transmitting said control message toward said crossconnect system for establishing said crossconnection.

17. The switching system of claim 16 wherein said processor means is further responsive to traffic reports, generated within said processor system in response to request to establish connections in said switching system, for detecting requirement for another crossconnection in said digital crossconnection system and for generating another control message for establishing said another crossconnection; and
said data transmission means is responsive to said generating of another control message for transmitting said another control message to said crossconnect system for establishing said crossconnection.

18. The switching system of claim 16, wherein said processor means comprises truck memory, wherein said control message causes said crossconnect system to establish a crossconnection for supplying additional trucks to a group in said switching system, further comprising:
processor means, responsive to said data message, for updating said trunk memory to record said addition of said additional trucks in said group.

19. The switching system of claim 17 further comprising interface means connected between said processor means for connection to data link means connected to said crossconnect system.

20. The switching system of claim 16 further comprising data link means connected to said processor means for connection to an operation support system for the transmission of said data message.

21. The switching system of claim 16 further comprising database means connected to said processor means for storing data of the state of said crossconnect system.

22. The switching system of claim 16 wherein said data reception means comprises a signaling interface means for connection to a signal transfer point for accessing other switches of a toll network.

23. A method of establishing a crossconnection in an automatic digital crossconnection system comprising controller means connected to and serving a communications switching system comprising processor means, comprising the steps of:
in said switching system, detecting a requirement for a crossconnection in said crossconnection system for interconnecting facilities each comprising a plurality of channels;
wherein said detecting a requirement comprises one of:
receiving in said switching system a customer rearrange request from a customer;
receiving in said switching system a service order message from an operation support system;
receiving in said switching system a message from a traffic control system;
receiving in said processor means of said switching system via a signaling interface a message from another switching system over a signaling network comprising a signal transfer point; and
detecting in said switching system a traffic condition requiring a change in use of facilities;
responsive to said detecting a requirement, generating a data message comprising data for establishing said crossconnection, said generating step comprising accessing data representing the state of connections in said crossconnect system to determine a crossconnection;
converting said determined crossconnection into data for transmission to said crossconnection system in said message;
transmitting a data message, comprising data for establishing such crossconnection, from said processor means of said switching system to said controller means of said crossconnect system for the establishment of a crossconnection for a facility comprising a plurality of circuits; and
responsive to receiving said message, establishing said crossconnection in said digital crossconnection system.

24. The method of claim 23 further comprising:
repeating the steps of claim 23 for a plurality of detected requirements, one of which is for a crossconnection of a particular facility connected to said switching system; and
setting up a call connection in said switching system over one of the channels of said particular facility.

25. A communication system comprising:
a switching network for establishing call connections between pairs of communication channels;
digital crossconnection means for establishing connections between multiplexed groups of communication channels connected to said switching network and multiplexed groups of communication channels connected to other digital crossconnection means; and
a control means operative under the control of a program, and responsive to requests for crossconnections of said groups of channels for dynamically controlling establishment of the requested crossconnections through said digital crossconnect means, and selectively responsive to call establishment request signals for controlling establishment of call connections through said switching network for calls on channels of groups crossconnected thereto.

26. The communication system of claim 25 further comprising:
data link means for sending control signals between said control means and said digital crossconnection means for controlling establishment of said requested crossconnections.

27. The communication system of claim 25 further comprising:
data link means for receiving crossconnection requests, for ones of said crossconnections, from another communication system.

28. The communication system of claim 25 further comprising:
data link means for receiving crossconnection requests, for ones of said crossconnections, from an operations support system.

29. The communication system of claim 25 wherein said crossconnection means is further connected through a multiplexed group of communication channels to a private customer, and further establishes connections from said groups connected to said switching network or ones of said groups connected to another communication system, to said group connected to said private customer, further comprising:
means for communicating requests for crossconnections in said digital crossconnection means from said private customer to said control means.

30. A method for use in a central office wire center including an interconnect arrangement terminating transmission facilities, said wire center further including a switching system, and control means common to said interconnect arrangement and said switching system, said switching system comprising a plurality of units including peripheral units for interfacing peripheral circuits with said switching system, said peripheral circuits including at least one of lines and trunks, said method comprising
responsive to said control means, said interconnect arrangement interconnecting said switching system and at least one multiplex of circuits of at least one of said facilities, and
responsive to said control means, said switching system establishing calls to and from individual ones of said multiplex of circuits interconnected with said switching system.

31. A method in accordance with claim 30 wherein said plurality of units further includes switching units for providing switched communication among said peripheral circuits in response to calls to and from said peripheral circuits, said method further comprising
said interconnect arrangement interconnecting ones of said plurality of units of said switching system.

32. A method in accordance with claim 31 wherein said interconnecting ones of said plurality of units of said switching system comprises
interconnecting one of said peripheral units and one of said switching units for switching calls to and from ones of said peripheral circuits.

33. A method in accordance with claim 32 wherein said interconnected one peripheral unit and one switching unit are at said central office wire center.

34. A method in accordance with claim 32 wherein said one switching unit is at said central office wire center and said one peripheral unit is at a remote terminal at a distance from said wire center.

35. A method in accordance with claim 31 wherein said interconnecting ones of said plurality of units of said switching system comprises
said interconnect arrangement interconnecting first and second ones of said switching units to provide switched communication from a first one of said peripheral circuits, via said interconnected first and second switching units, to a second one of said peripheral circuits.

36. A method in accordance with claim 35 wherein said first switching unit is a host switching unit at said central office wire center, and said second switching unit is a remote switching unit at a distance from said wire center.

37. A method in accordance with claim 35 wherein said first and second switching units are distributed switch units at said central office wire center.

38. A method in accordance with claim 37 wherein said switching system further includes central switch means for providing switched communication between different ones of said switching units, said method further comprising
said central switch means providing switched communication between said first and second switching units.

39. A method for use in a central office wire center including an interconnect arrangement terminating transmission facilities, said wire center further including a switching system comprising a plurality of units including peripheral units for interfacing peripheral circuits with said switching system, said peripheral circuits including at least one of lines and trunks, said plurality of units further including switching units for providing switched communication among said peripheral circuits in response to calls to and from said peripheral circuits, said method comprising
said interconnect arrangement interconnecting said switching system and at least one multiplex of circuits of at least one of said facilities, and
said interconnect arrangement interconnecting ones of said plurality of units of said switching system.

40. A method in accordance with claim 39 wherein said central office wire center further includes control means, common to said interconnect arrangement and said switching system, said method further comprising
said common control means controlling said provision of switched communication among said peripheral circuits in response to said calls, and
said common control means also controlling said interconnect arrangement.

41. In combination,
a switching system for selectively interconnecting ones of a plurality of communication circuits,
interconnect means for selectively interconnecting ones of a plurality of communication circuit multiplexes, said plurality of multiplexes comprising a first multiplex connected to said switching system, and
control means, common to said switching system and said interconnect means, for controlling both the interconnection by said interconnect means of ones of said plurality of multiplexes, and the establishment by said switching system of calls to and from individual ones of said circuits of said first multiplex.

42. The combination of claim 41 wherein said interconnect means comprises a crossconnect system.

43. The combination of claim 41 wherein said interconnect means comprises a plurality of units interconnected in a ring configuration.

44. The combination of claim 41 wherein said control means comprises a common operations, administration, maintenance, and provisioning system for said switching system and said interconnect means.

45. The combination of claim 41 wherein said interconnect means has a plurality of ports connected to said plurality of multiplexes, and comprises
  interconnect control means responsive to said common control means for controlling the interconnection by said interconnect means of ones of said ports.

46. The combination of claim 41 wherein said interconnect means is colocated with said switching system at a central office wire center.

47. The combination of claim 41 wherein
  said plurality of multiplexes further comprises a second multiplex conveying information to and from a plurality of peripheral communication circuits comprising at least one of lines and trunks, and
  said control means controls the interconnection by said interconnect means of said first and second multiplexes, and the establishment by said switching system of said calls to and from individual ones of said peripheral communication circuits via said first multiplex, said interconnect means, and said second multiplex.

48. The combination of claim 47 wherein said plurality of multiplexes includes third and fourth multiplexes that are not connected to said switching system, and said control means controls the interconnection by said interconnect means of said third and fourth multiplexes.

49. The combination of claim 48 wherein said third multiplex is connected to a switching system independent from said control means.

50. The combination of claim 49 wherein said fourth multiplex is connected to interconnect means independent from said control means.

51. The combination of claim 49 wherein said fourth multiplex is connected to a second switching system independent from said control means.

52. The combination of claim 48 wherein said third multiplex is connected to an interconnect means independent from said control means and said fourth multiplex is connected to a second interconnect means independent from said control means.

53. The combination of claim 47 wherein said peripheral communication circuits are customer lines.

54. The combination of claim 47 wherein said peripheral communication circuits are trunks.

55. The combination of claim 47 wherein said switching system comprises
  a plurality of distributed switch means.

56. The combination of claim 55 wherein said switching system further comprises
  central switch means for selectively interconnecting individual, switched communication circuits between ones of said distributed switch means.

57. The combination of claim 56 wherein said control means is responsive to ones of said calls for controlling said distributed switch means and said central switch means to switch said ones of said calls via said central switch means.

58. The combination of claim 55 wherein said switching system further comprises
  remote switch means interconnected with said interconnect means via said second multiplex,
  wherein said first multiplex is connected to one of said distributed switch means, and said control means is responsive to ones of said calls for controlling said remote and said one distributed switch means to switch said ones of said calls via said remote switch means, said second multiplex, said interconnect means, said first multiplex, and said one distributed switch means.

59. The combination of claim 55 wherein said switching system further comprises
  peripheral interface means for interfacing a plurality of said peripheral communication circuits and interconnected with said interconnect means via said second multiplex,
  wherein said first multiplex is connected to one of said distributed switch means, and said control means is responsive to ones of said calls for controlling said one distributed switch means to switch said ones of said calls via said peripheral interface means, said second multiplex, said interconnect means, said first multiplex, and said one distributed switch means.

60. The combination of claim 59 wherein said plurality of distributed switch means are at a central office and said peripheral interface means is at a remote terminal.

61. The combination of claim 60 wherein said peripheral interface means is a digital loop carrier system.

62. The combination of claim 55 wherein said interconnect means comprises a crossconnect system.

63. The combination of claim 55 wherein said interconnect means comprises a plurality of add/drop multiplexer units each connected to an associated one of said distributed switch means.

64. The combination of claim 63 wherein said plurality of units are interconnected in a ring configuration.

65. The combination of claim 55 wherein said control means comprises a plurality of distributed control means each associated with one of said distributed switch means.

66. The combination of claim 65 wherein said control means further comprises central control means which cooperates with said plurality of distributed control means to control the establishment of said calls.

67. The combination of claim 66 wherein said interconnect means comprises a plurality of ports connected to said plurality of multiplexes, and interconnect control means responsive to said central control means for controlling the interconnection by said interconnect means of ones of said ports.

68. The combination of claim 65 wherein said interconnect means comprises a crossconnect system.

69. The combination of claim 65 wherein said interconnect means comprises a plurality of add/drop multiplexer units each connected to an associated one of said distributed switch means and controlled by the associated one of said distributed control means.

70. The combination of claim 69 wherein said plurality of units are interconnected in a ring configuration.

71. In combination, a switching system for switching communication circuits, said system including first and second multiplexes of said communication circuits, interconnection means for selectively interconnecting ones of a plurality of communication circuit multiplexes including said first and second multiplexes, and third and fourth multiplexes not connected to said switching system, system control means for controlling said switching system to establish calls to and from individual communication circuits of said first and second multiplexes, and interconnect control means for controlling said interconnection means to interconnect said first and second multiplexes and to interconnect said third and fourth multiplexes.

72. The combination of claim 71 wherein said interconnect control means is responsive to said system control means for controlling said interconnect means to interconnect said first and second multiplexes and to interconnect said third and fourth multiplexes.

73. The combination of claim 41 wherein said switching system comprises a plurality of distributed switch means, said first multiplex is connected to a first one of said distributed switch means, and said plurality of multiplexes further comprises a second multiplex connected to a second one of said distributed switch means.

74. The combination of claim 73 wherein said plurality of multiplexes further comprises a third multiplex conveying information to and from a first plurality of peripheral communication circuits comprising at least one of lines and trunks, said plurality of multiplexes further comprises a fourth multiplex conveying information to and from a second plurality of peripheral communication circuits comprising at least one of lines and trunks, and said control means controls the interconnection by said interconnect means of said first and third multiplexes and of said second and fourth multiplexes, and the establishment by said switching system of ones of said calls to and from individual ones of said first plurality of peripheral communication circuits via said first distributed switch means, said first multiplex, said interconnect means and said third multiplex, and of ones of said calls to and from individual ones of said second plurality of peripheral communication circuits via said second distributed switch means, said second multiplex, said interconnect means and said fourth multiplex.

75. The combination of claim 73, said first distributed switch means for switching ones of said calls to and from a first plurality of peripheral communications circuits comprising at least one of lines and trunks, and said second distributed switch means for switching ones of said calls to and from a second plurality of peripheral communication circuits comprising at least one of lines and trunks.

76. The combination of claim 75 wherein said plurality of multiplexes further comprises a third multiplex conveying information to and from said first plurality of peripheral communication circuits, said plurality of multiplexes further comprises a fourth multiplex conveying information to and from said second plurality of peripheral communication circuits, and said control means controls the interconnection by said interconnect means of said first and third multiplexes and of said second and fourth multiplexes.

77. The combination of claim 41 wherein said switching system comprises a plurality of distributed switch means, said control means comprises a plurality of distributed control means each associated with one of said distributed switch means, and central control means which cooperates with said plurality of distributed control means to control the establishment of said calls and which cooperates with one of said plurality of distributed control means to control said interconnect means.

78. The combination of claim 77 wherein said interconnect means comprises a plurality of ports connected to said plurality of multiplexes, and interconnect control means responsive to said one distributed control means for controlling the interconnection by said interconnect means of ones of said ports.

79. The combination of claim 78 wherein said interconnect means comprises a crossconnect system.

80. The combination of claim 41 wherein said switching system comprises first switching means located at a central office, second switching means at a remote location from said central office, and wherein said interconnect means is colocated with said first switching means at said central office.

81. The combination of claim 80 further comprising interconnect means colocated with said second switching means at said remote location for selectively interconnecting ones of a plurality of communication circuit multiplexes including a multiplex connected to said second switching means.

82. The combination of claim 41 wherein said switching system comprises first switching means located at a central office, second switching means at a remote location from said central office, and wherein said interconnect means is colocated with said second switching means at said remote location.

83. The combination of claim 58 further comprising remote interconnect means, interposed between said second multiplex and said remote switch means, for selectively interconnecting ones of a plurality of communication circuit multiplexes including said second multiplex.

84. The combination of claim 41 wherein said interconnect means selectively interconnects first and second broadband links, said first broadband link connectable to a first broadband terminal, said second broadband link connectable to a second broadband terminal, and said control means being responsive to a call request for a real-time, switched broadband connection between said first and second broadband terminals for controlling the interconnection by said interconnect means of said first and second broadband links.

* * * * *

UNITED STATES PATENT AND TRADEMARK OFFICE
CERTIFICATE OF CORRECTION

PATENT NO. : 5,138,657

DATED : August 11, 1992

INVENTOR(S) : John R. Colton, Charles D. Gavrilovich, Richard N. Kennedy, Jr., John J. Kulzer, Reinhard Metz, Larry A. Russell, Teresa L. Russell It is certified that error appears in the above-identified patent and that said Letters Patent is hereby corrected as shown below:

On the Title page, item [75], "Larry A. Russel" should be --Larry A. Russell--.

Column 5, line 20, "3082" should be --3092--;

Column 14, line 9, "STS" should be --STS-3--,

Column 14, line 12, "M/bs" should be --Mb/s--.

In the Claims:

Column 20, line 58, claim 7, "charge" should be --change--;

Column 21, line 2, claim 11, "trucks" should be --trunks--;

Column 21, line 55, claim 18, "truck" should be --trunk--;

UNITED STATES PATENT AND TRADEMARK OFFICE
CERTIFICATE OF CORRECTION

PATENT NO. : 5,138,657

DATED : August 11, 1992

INVENTOR(S) : John R. Colton, Charles D. Gavrilovich, Richard N. Kennedy, Jr., John J. Kulzer, Reinhard Metz, Larry A. Russell, Teresa L. Russell It is certified that error appears in the above-identified patent and that said Letters Patent is hereby corrected as shown below:

Column 21, line 58, claim 18, "trucks" should be --trunks--;

Column 21, line 62, claim 18, "trucks" should be --trunks--.

Signed and Sealed this

Twenty-first Day of September, 1993

*Attest:*

BRUCE LEHMAN

*Attesting Officer*      *Commissioner of Patents and Trademarks*